United States Patent
Pastrick et al.

(10) Patent No.: US 7,083,312 B2
(45) Date of Patent: Aug. 1, 2006

(54) LIGHTED EXTERIOR MIRROR SYSTEM FOR A VEHICLE

(75) Inventors: Todd W. Pastrick, Spring Lake, MI (US); Michiel P. van de Ven, Zeeland, MI (US); Peter J. Whitehead, Holland, MI (US); Rick Mousseau, Holland, MI (US)

(73) Assignee: Donnelly Corporation, Holland, MI (US)

( * ) Notice: Subject to any disclaimer, the term of this patent is extended or adjusted under 35 U.S.C. 154(b) by 79 days.

(21) Appl. No.: 10/770,097

(22) Filed: Feb. 2, 2004

(65) Prior Publication Data

US 2004/0156207 A1 Aug. 12, 2004

Related U.S. Application Data

(63) Continuation of application No. 10/190,840, filed on Jul. 8, 2002, now Pat. No. 6,685,348, which is a continuation of application No. 09/866,398, filed on May 25, 2001, now Pat. No. 6,416,208, which is a continuation of application No. 09/335,010, filed on Jun. 17, 1999, now Pat. No. 6,276,821, which is a continuation-in-part of application No. 09/102,414, filed on Jun. 22, 1998, now Pat. No. 6,176,602, which is a continuation-in-part of application No. 08/934,490, filed on Sep. 19, 1997, now Pat. No. 5,863,116, which is a continuation of application No. 08/607,285, filed on Feb. 26, 1996, now Pat. No. 5,669,705, which is a continuation of application No. 08/333,412, filed on Nov. 2, 1994, now Pat. No. 5,497,305, which is a continuation of application No. 08/011,947, filed on Feb. 1, 1993, now Pat. No. 5,371,659, said application No. 09/102,414, filed on Jun. 22, 1998, is a continuation-in-part of application No. 08/687,628, filed on Jul. 26, 1996, now Pat. No. 5,823,654, which is a continuation-in-part of application No. 08/607,284, filed on Feb. 26, 1996, now Pat. No. 5,669,704, which is a continuation of application No. 08/426,591, filed on Apr. 21, 1995, now Pat. No. 5,497,306, which is a continuation-in-part of application No. 08/333,412, which is a continuation of application No. 08/011,947.

(51) Int. Cl.
*B60Q 1/32* (2006.01)
*B60Q 1/062* (2006.01)

(52) U.S. Cl. .................. 362/494; 362/513; 362/523; 362/428; 116/54; 340/475; 359/872

(58) Field of Classification Search .............. 362/494, 362/513, 523, 428, 487, 143, 463, 466, 467, 362/540, 512, 362, 368, 370–372, 382, 418, 362/427, 433, 449; 116/54, 52, 28 R, 35 R, 116/46, 49, 51; 340/475, 472, 468, 471, 476, 340/477; 359/872, 871, 549, 838, 841, 843, 359/873, 876
See application file for complete search history.

(56) References Cited

U.S. PATENT DOCUMENTS 1,096,452 A  5/1914  Perrin
(Continued)

FOREIGN PATENT DOCUMENTS

DE  29702746 U1  5/1957
DE  2634372  2/1978
(Continued)

OTHER PUBLICATIONS

European Search Report for European Application EP 96 65 0012 which is based on related U.S. Appl No. 5,497,306.
(Continued)

*Primary Examiner*—Sandra O'Shea
*Assistant Examiner*—Ismael Negron
(74) *Attorney, Agent, or Firm*—Van Dyke, Gardner, Linn & Burkhart, LLP

(57) ABSTRACT

A lighted exterior mirror system for a vehicle comprises an exterior mirror assembly having a first portion adapted for mounting to a vehicle and an actuator disposed at a second portion. A reflective element is supported by a reflective element support member mounted to the actuator to adjust the rearward field of view of the reflective element. The assembly includes a turn signal indicator disposed adjacent to and separate from the reflective element. The turn signal indicator emits a light beam at least generally laterally and rearwardly of the vehicle when the exterior mirror assembly is mounted to a vehicle. The turn signal indicator is adjusted tandem with the reflective element by the actuator. The light beam is substantially unobservable by the driver of the vehicle and does not pass through the reflective element.

93 Claims, 22 Drawing Sheets

U.S. PATENT DOCUMENTS

| | | | |
|---|---|---|---|
| 1,278,741 A | 9/1918 | Phelps | |
| 1,353,253 A | 9/1920 | Livingston et al. | |
| 1,415,465 A | 9/1922 | Nigh | |
| 1,458,703 A | 6/1923 | Harris et al. | |
| 1,563,258 A | 11/1925 | Cunningham | |
| 1,602,094 A | 10/1926 | Badding | |
| 2,010,138 A | 8/1935 | Condon | 177/329 |
| 2,235,181 A | 3/1941 | Thiel | 362/494 |
| 2,273,570 A | 2/1942 | Greenlees | |
| 2,295,176 A | 9/1942 | Kelly | 362/83.1 |
| 2,414,223 A | 1/1947 | DeVirgilis | 340/42 |
| 2,457,348 A | 12/1948 | Chambers | |
| 2,511,971 A | 6/1950 | Dalton | 362/83.1 |
| 2,562,687 A | 7/1951 | Anderson | |
| 3,522,584 A | 8/1970 | Talbot | 340/98 |
| 3,596,079 A | 7/1971 | Clark | |
| 3,883,732 A * | 5/1975 | Peterson et al. | 362/294 |
| 4,041,301 A | 8/1977 | Pelchat | |
| 4,143,368 A | 3/1979 | Route et al. | 340/543 |
| 4,205,325 A | 5/1980 | Haygood et al. | |
| 4,258,352 A | 3/1981 | Lipschutz | |
| 4,274,078 A | 6/1981 | Isobe et al. | 340/98 |
| 4,281,899 A | 8/1981 | Oskam | 350/289 |
| 4,342,210 A | 8/1982 | Denningham | |
| 4,446,380 A | 5/1984 | Moriya et al. | |
| 4,475,100 A | 10/1984 | Duh | 340/98 |
| 4,569,002 A | 2/1986 | English et al. | 362/80 |
| 4,583,155 A | 4/1986 | Hart | 362/285 |
| 4,626,084 A | 12/1986 | Kumai | 359/841 |
| 4,646,207 A | 2/1987 | Levin et al. | 362/80 |
| 4,661,800 A | 4/1987 | Yamazaki | 340/98 |
| 4,688,036 A | 8/1987 | Hirano et al. | |
| 4,693,571 A | 9/1987 | Kimura et al. | 350/364 |
| 4,733,336 A | 3/1988 | Skogler et al. | 362/142 |
| 4,772,989 A | 9/1988 | Haraden | 362/80 |
| 4,807,096 A | 2/1989 | Skogler et al. | 362/142 |
| 4,808,968 A | 2/1989 | Caine | 340/71 |
| 4,809,137 A | 2/1989 | Yamada | 362/61 |
| 4,851,970 A | 7/1989 | Bronder | 362/66 |
| 4,866,417 A | 9/1989 | DeFino et al. | |
| 4,868,722 A | 9/1989 | Haraden | 362/80 |
| 4,881,148 A | 11/1989 | Lambropoulos et al. | |
| 4,890,907 A | 1/1990 | Vu et al. | |
| 4,916,430 A | 4/1990 | Vu et al. | |
| 5,014,167 A | 5/1991 | Roberts | 362/83.1 |
| 5,017,903 A | 5/1991 | Krippelz, Sr. | |
| 5,038,255 A | 8/1991 | Nishihashi | |
| 5,049,867 A | 9/1991 | Stouffer | |
| 5,059,015 A | 10/1991 | Tran | 359/844 |
| 5,109,214 A | 4/1992 | Heidman, Jr. | 340/475 |
| 5,113,182 A | 5/1992 | Suman et al. | |
| 5,132,882 A | 7/1992 | Alder | |
| 5,151,824 A | 9/1992 | O'Farrell | |
| 5,179,471 A | 1/1993 | Caskey et al. | |
| 5,206,562 A | 4/1993 | Matsuno et al. | 315/77 |
| 5,207,492 A | 5/1993 | Roberts | |
| 5,223,814 A | 6/1993 | Suman | 340/525 |
| 5,287,101 A | 2/1994 | Serizawa | 340/815.76 |
| 5,303,130 A | 4/1994 | Wei et al. | |
| 5,313,335 A | 5/1994 | Gray et al. | |
| 5,371,659 A | 12/1994 | Pastrick et al. | |
| 5,402,103 A * | 3/1995 | Tashiro | 362/494 |
| 5,436,741 A * | 7/1995 | Crandall | 362/494 |
| 5,497,305 A | 3/1996 | Pastrick et al. | |
| 5,497,306 A | 3/1996 | Pastrick | |
| 5,499,169 A | 3/1996 | Chen | 362/83.1 |
| 5,587,699 A | 12/1996 | Faloon et al. | 340/475 |
| 5,624,176 A * | 4/1997 | O'Farrell et al. | 362/494 |
| 5,660,457 A | 8/1997 | Lyons | 362/83.1 |
| 5,669,699 A | 9/1997 | Pastrick et al. | 362/83.1 |
| 5,669,704 A | 9/1997 | Pastrick | 362/83.1 |
| 5,669,705 A | 9/1997 | Pastrick | 362/83.1 |
| 5,788,357 A | 8/1998 | Muth et al. | 362/494 |
| 5,823,654 A | 10/1998 | Pastrick et al. | 362/83.1 |
| 5,863,116 A | 1/1999 | Pastrick et al. | 362/494 |
| 5,871,275 A | 2/1999 | O'Farrell et al. | 362/494 |
| 5,879,074 A | 3/1999 | Pastrick | 362/494 |
| 5,886,838 A | 3/1999 | Kuramoto | 359/841 |
| 5,938,320 A | 8/1999 | Crandall | 362/494 |
| 6,045,243 A | 4/2000 | Muth et al. | 362/494 |
| 6,074,077 A | 6/2000 | Pastrick et al. | 362/494 |
| 6,076,948 A | 6/2000 | Bukosky et al. | 362/494 |
| 6,086,229 A | 7/2000 | Pastrick | 362/494 |
| 6,099,153 A | 8/2000 | Zimmermann et al. | 362/494 |
| 6,099,155 A | 8/2000 | Pastrick | 362/494 |
| 6,139,171 A | 10/2000 | Waldmann | 362/494 |
| 6,139,176 A | 10/2000 | Hulse et al. | 362/581 |
| 6,149,287 A | 11/2000 | Pastrick et al. | 362/494 |
| 6,176,602 B1 | 1/2001 | Pastrick et al. | 362/494 |
| 6,206,553 B1 | 3/2001 | Boddy | 362/495 |
| 6,250,783 B1 | 6/2001 | Stidham et al. | 362/494 |
| 6,276,821 B1 | 8/2001 | Pastrick et al. | 362/494 |
| 6,280,068 B1 | 8/2001 | Mertens et al. | 362/494 |
| 6,299,333 B1 | 10/2001 | Pastrick | 362/494 |
| 6,315,437 B1 | 11/2001 | Katz et al. | 362/494 |
| 6,367,957 B1 | 4/2002 | Hering et al. | 362/511 |
| 6,416,208 B1 | 7/2002 | Pastrick | 362/494 |

FOREIGN PATENT DOCUMENTS

| | | |
|---|---|---|
| DE | 3614882 | 11/1987 |
| DE | 3635473 | 4/1988 |
| DE | 3635471 | 5/1988 |
| DE | 3803510 A | 9/1988 |
| DE | 9101029 | 5/1991 |
| DE | 4141208 | 6/1993 |
| DE | 94095663 | 9/1994 |
| DE | 19538771 A1 | 4/1997 |
| DE | 19736482 | 2/1998 |
| EP | 0525541 | 11/1994 |
| EP | 0738627 | 10/1996 |
| EP | 0820900 | 1/1998 |
| FR | 1461419 | 12/1966 |
| FR | 2612136 | 9/1988 |
| FR | 2618397 | 1/1989 |
| GB | 1555541 | 11/1979 |
| GB | 2129749 | 5/1984 |
| GB | 2154969 | 9/1985 |
| GB | 2161440 A | 1/1986 |
| GB | 2266870 | 11/1993 |
| GB | 2275329 A | 8/1994 |
| GB | 2316379 A | 2/1998 |
| JP | 58188733 | 11/1983 |
| JP | 60161646 | 10/1985 |
| JP | 61218452 A | 9/1986 |
| JP | 62191246 A | 8/1987 |
| JP | 62218248 | 9/1987 |
| JP | 1239273 | 9/1989 |
| JP | 3050044 | 4/1991 |
| JP | 8142745 A | 6/1996 |
| JP | 61188242 | 8/1996 |
| JP | 9095177 | 4/1997 |
| WO | WO 8901425 | 2/1989 |

OTHER PUBLICATIONS

European Search Report for European Application EP 99 65 0053 which is based on related U.S. Appl. No. 09/335,010, filed Jun. 17, 1999.

* cited by examiner

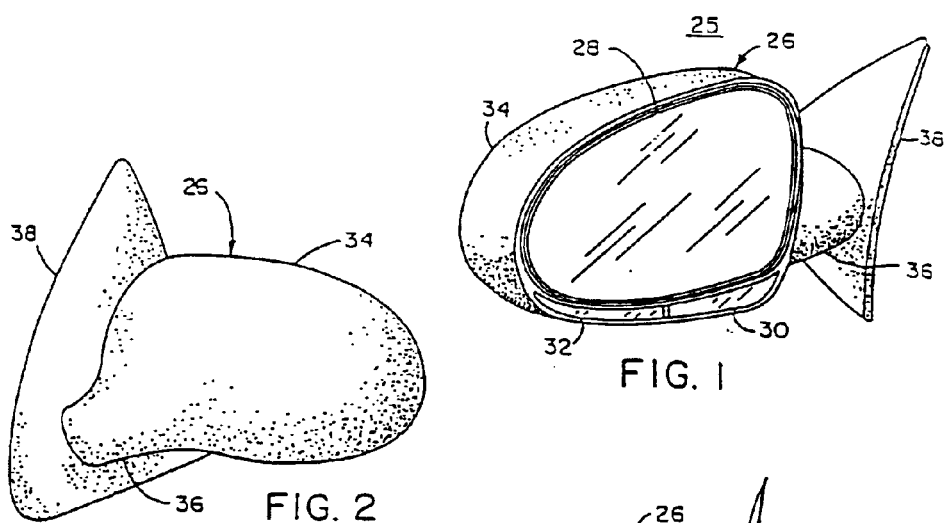
FIG. 1
FIG. 2
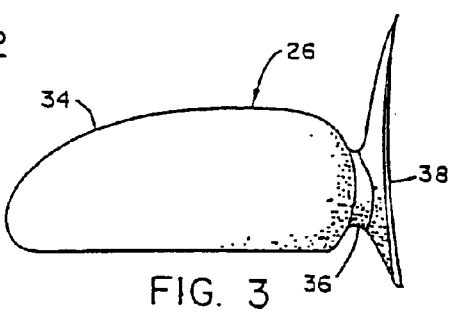
FIG. 3
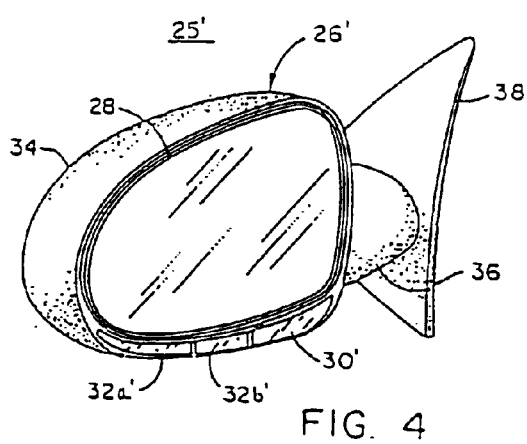
FIG. 4

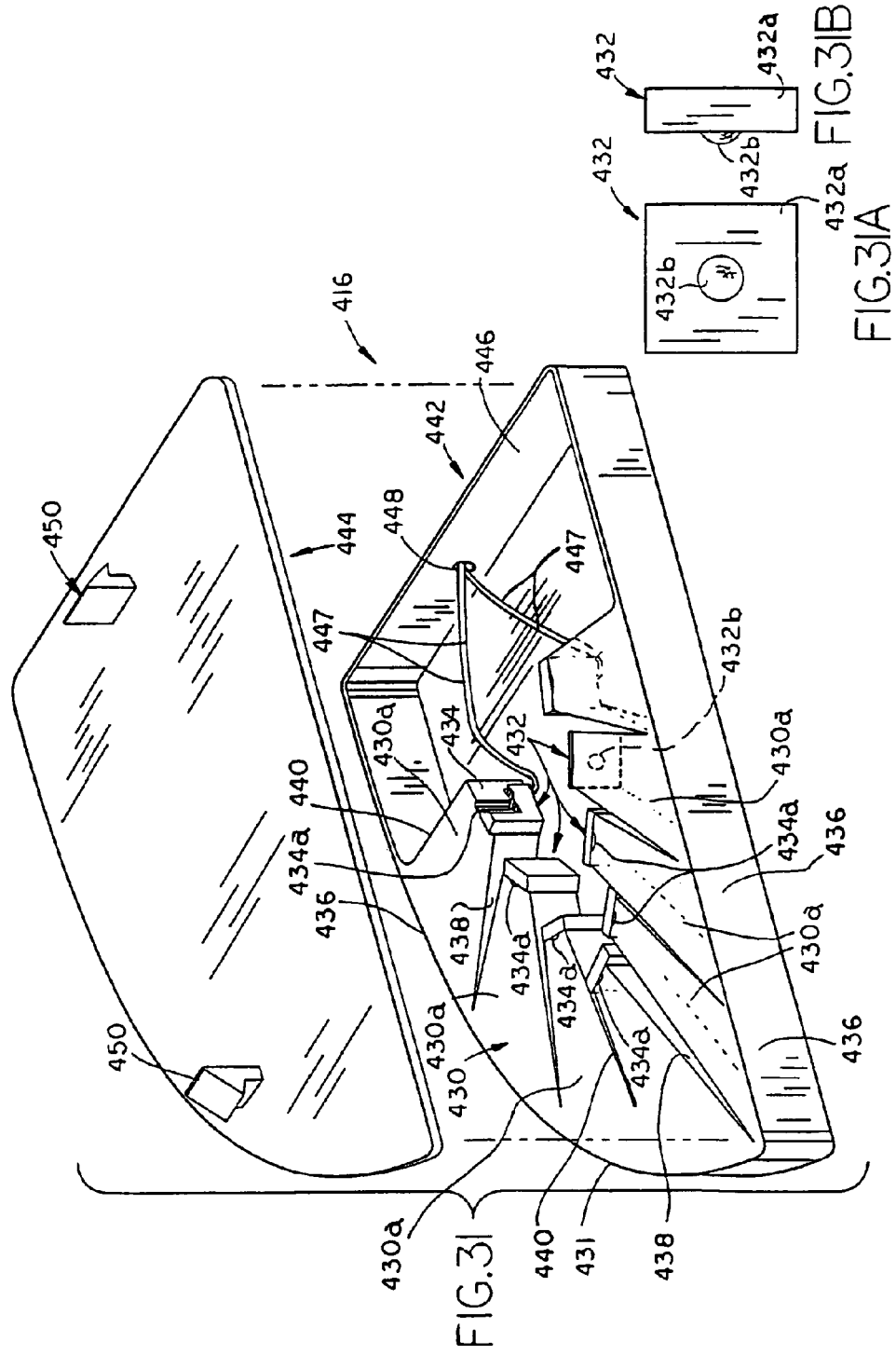

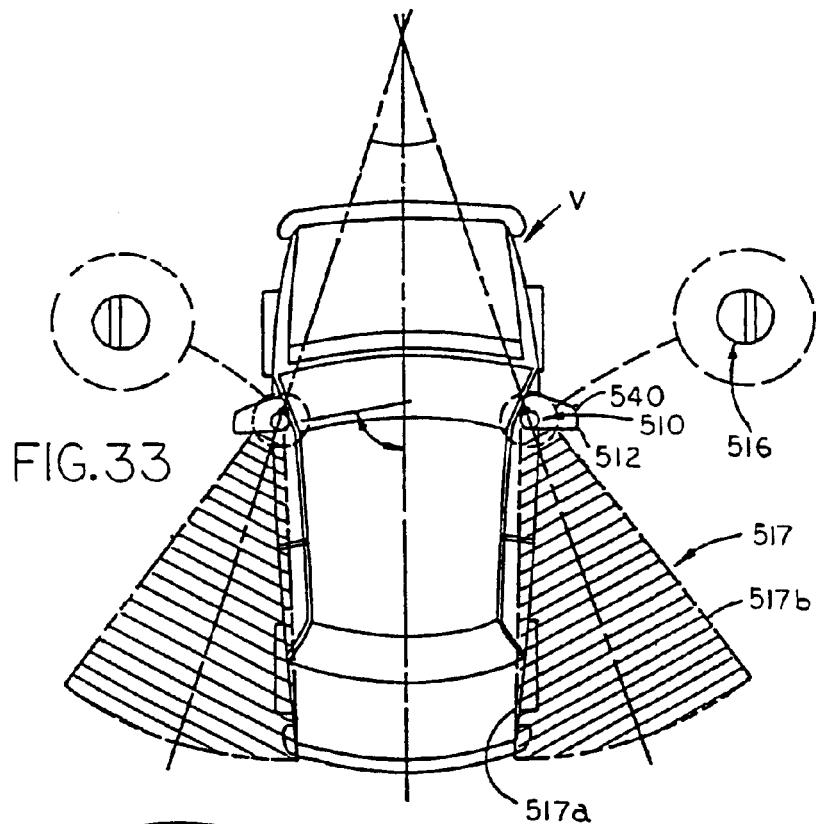
FIG. 33
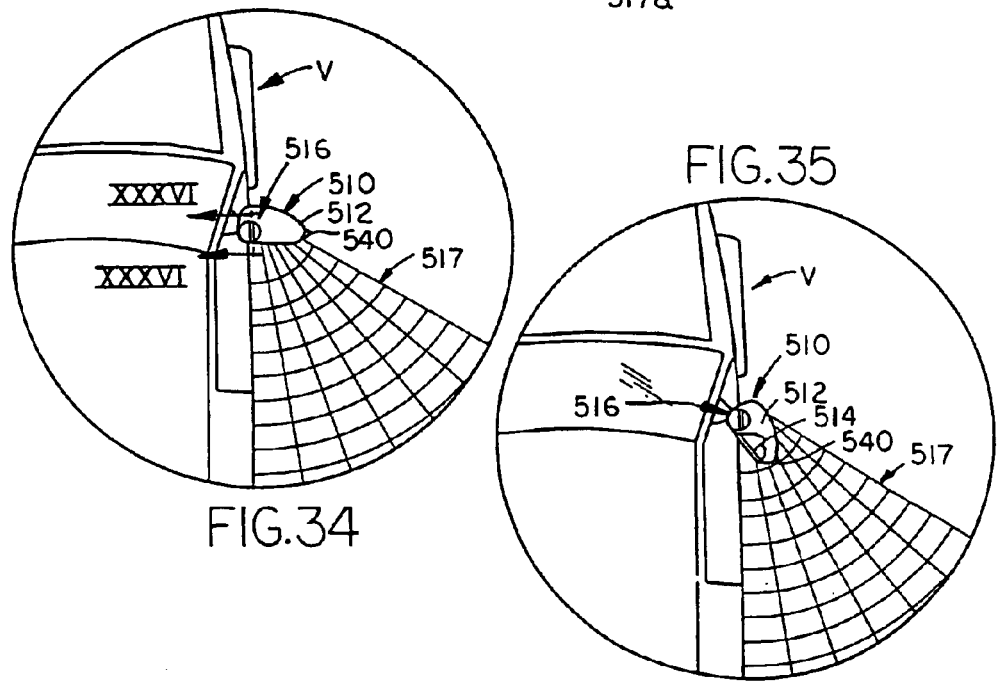
FIG. 34
FIG. 35

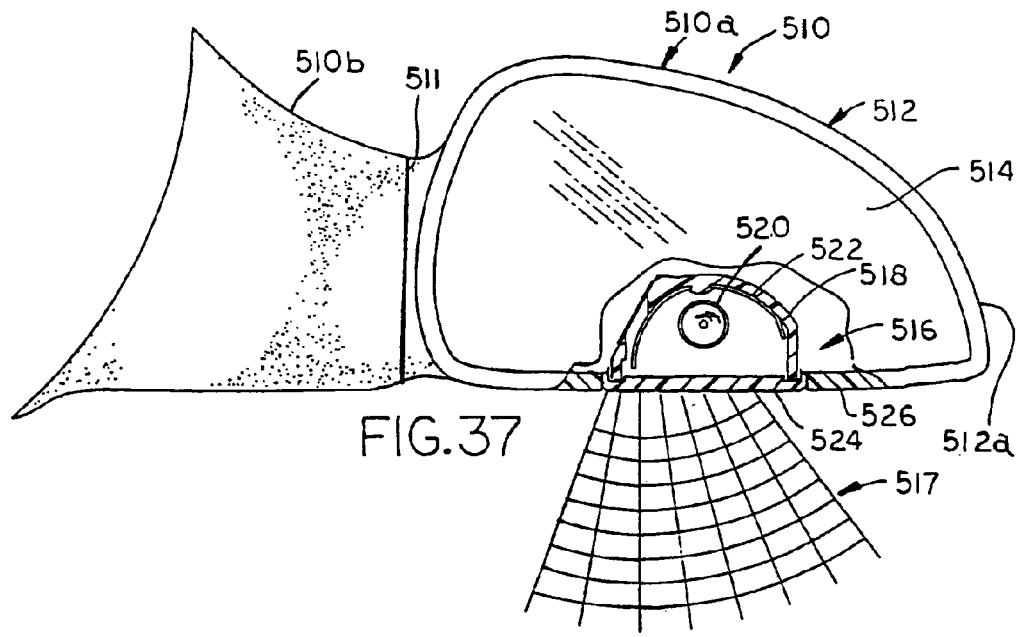
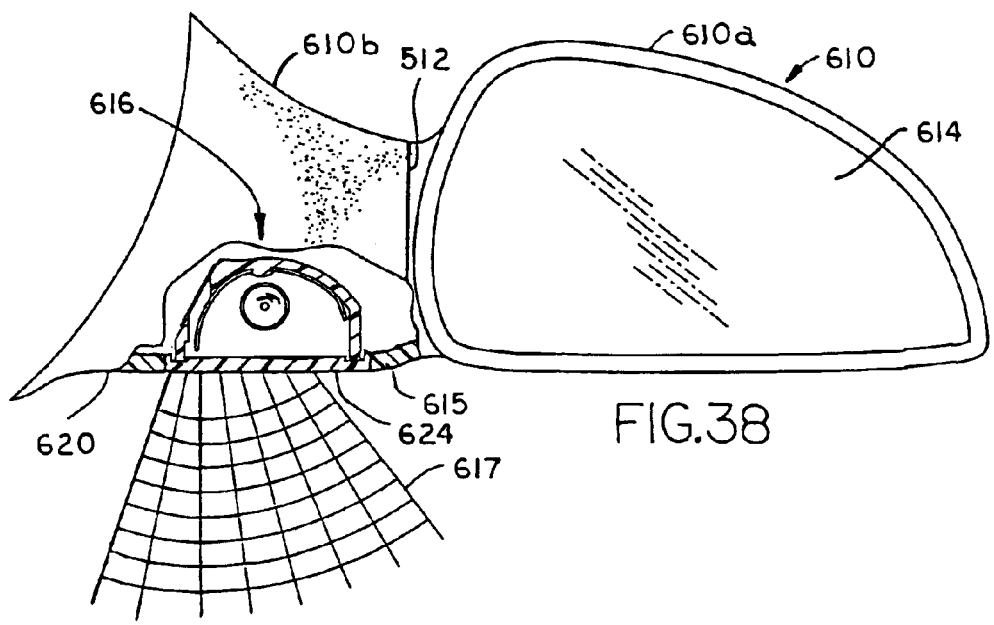

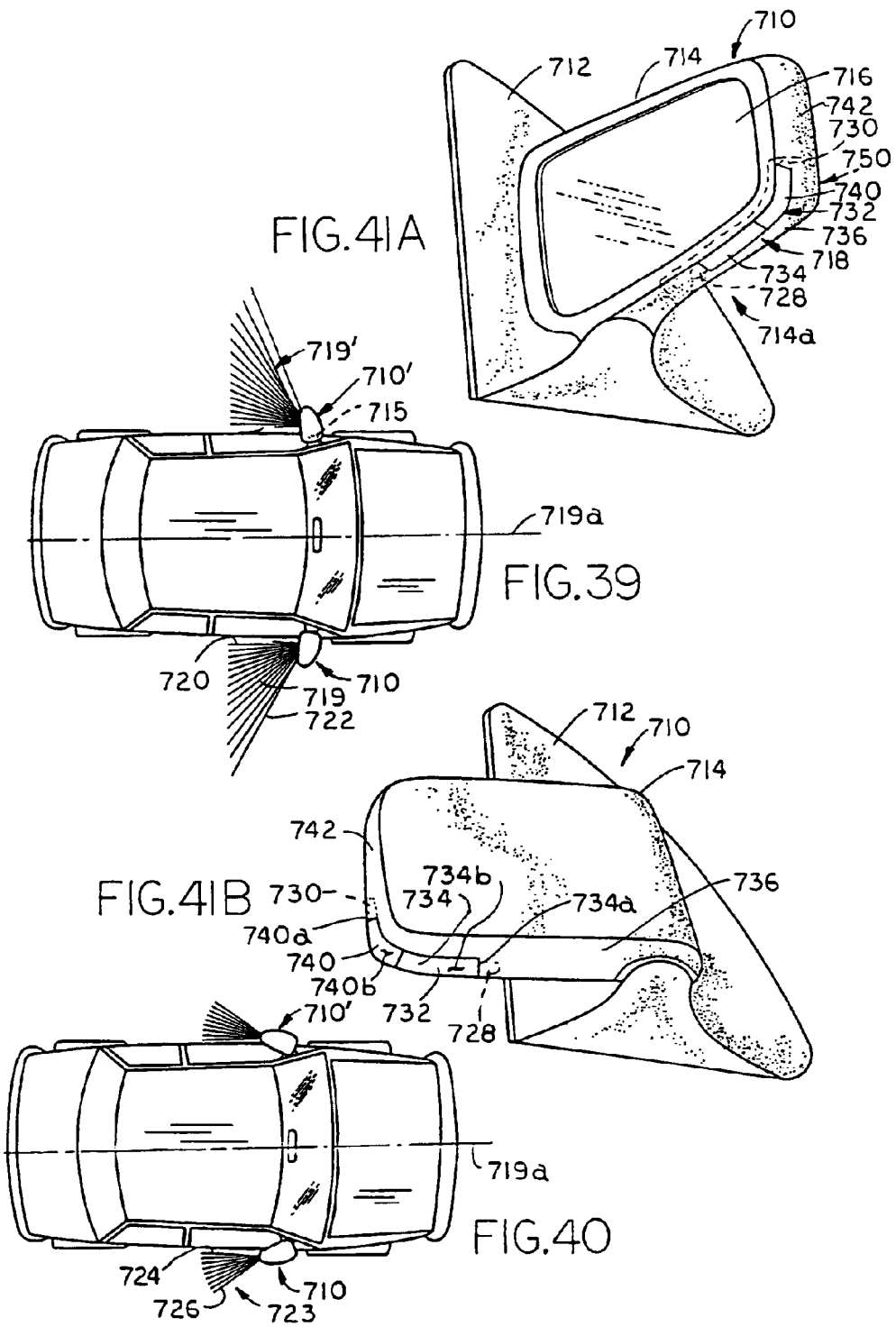

LIGHTED EXTERIOR MIRROR SYSTEM FOR A VEHICLE

This application is a continuation of application Ser. No. 10/190,840, filed Jul. 8, 2002, by Todd W. Pastrick, Michiel P. van de Ven, Peter J. Whitehead, Rick Mousseau, and Dr. Niall R. Lynam, which is now U.S. Pat. No. 6,685,348, which is a continuation of U.S. Pat. No. 6,416,208, which is a continuation application of U.S. Pat. No. 6,276,821, which is a continuation-in-part of U.S. Pat. No. 6,176,602, which is a continuation-in-part of U.S. Pat. No. 5,863,116, which is a continuation of U.S. Pat. No. 5,669,705, which is a continuation of U.S. Pat. No. 5,497,305, which is a continuation of U.S. Pat. No. 5,371,659, all of which are incorporated in their entireties by reference herein. The great-great-grandparent application, U.S. Pat. No. 6,176,602, is additionally a continuation-in-part of U.S. Pat. No. 5,823,654, which is a continuation-in-part of U.S. Pat. No. 5,669,704, which is a continuation of U.S. Pat. No. 5,497,306, which is a continuation-in-part of U.S. Pat. No. 5,497,305, which is a continuation of U.S. Pat. No. 5,371,659, all of which are incorporated by reference herein in their entireties.

TECHNICAL FIELD AND BACKGROUND OF THE INVENTION

This invention relates generally to security systems for vehicles and, more particularly, to remotely actuated, personal safety lighting systems. The invention is particularly adapted to incorporation in the exterior mirrors of a vehicle.

Personal security in and around vehicles has become an important concern. In particular, an increasing number of assaults and robberies are committed in parking lots while occupants are entering and exiting vehicles. While remote-operated, keyless entry systems have been incorporated in vehicles in order to unlock the vehicle and illuminate interior lights, such systems merely expedite entry to the vehicle and do not, per se, enhance security around the vehicle. Accordingly, a need exists for a vehicle security system to increase the security for vehicle occupants while entering and exiting the vehicle. Any such system would need to be aesthetically pleasing and not burdensome in use.

SUMMARY OF THE INVENTION

The present invention is intended to provide a personal safety feature for a vehicle in the form of a floodlight adapted to projecting light generally downwardly on an area adjacent a portion of the vehicle in order to create a lighted security zone in the area. Advantageously, the floodlight is preferably positioned in the housing of an exterior mirror having a reflective element also positioned in the housing. According to an aspect of the invention, an actuator is provided for the floodlight including a base unit in the vehicle and a remote transmitter. The base unit is responsive to a signal from the remote transmitter in order to actuate the floodlight. This allows the vehicle operator to actuate the floodlight from a distance in order to establish the security zone prior to approaching the vehicle.

According to another aspect of the invention, an actuator for the floodlight includes a lockout device in order to prevent actuation of the floodlight during operation of the vehicle. According to yet a further aspect of the invention, a signal light that is adapted to projecting light generally rearwardly of the vehicle is included in the exterior mirror housing. An actuator for the warning light is connected with the stoplight circuit, turn signal circuit, or both the stoplight and turn signal circuit, of the vehicle in order to actuate the warning light when either the stoplight or turn signal is being actuated.

According to yet another aspect of the invention, the floodlight is adapted to projecting a pattern of light from the housing on an area adjacent a portion of the vehicle that extends laterally onto the vehicle and downwardly and rearwardly of the vehicle. In this manner, a security zone is established from the vehicle door to the rear of the vehicle. The signal light is adapted to projecting a pattern of light extending laterally away from the vehicle and rearwardly of the vehicle. In this manner, the pattern generated by the signal light cannot be substantially observed by a driver of the vehicle. However, the pattern generated by the signal light may be observed by a driver of another vehicle passing the vehicle equipped according to the invention.

The floodlight and signal lights may be generated by a light emitting diode positioned in the housing, a vacuum fluorescent lamp positioned in the housing, an incandescent lamp positioned in the housing or a light source in the vehicle and a light pipe between the light source and the mirror housing.

By providing a lighted security zone adjacent the vehicle, users can observe suspicious activity around the vehicle. The pattern of light generated by a security light according to the invention establishes a security zone around, and even under, the vehicle in the important area where the users enter and exit the vehicle. The provision for remote actuation of the security light provides a deterrent to ward off persons lurking around the protected vehicle while the users are still at a safe distance from the vehicle. The provision for a lockout circuit ensures that the security light will not inadvertently be actuated while the vehicle is in motion. The invention, further, conveniently combines a signal light that acts in unison with the vehicle's turn signal, brake light, or both, with the security light in an exterior mirror assembly. The signal light may be designed to be observed by other vehicles passing the equipped vehicle but not directly by the driver of the equipped vehicle.

The present invention further provides an exterior mirror system for a vehicle, which incorporates a signal light into the exterior rearview mirror assembly. The signal light provides a light pattern which preferably extends forwardly, rearwardly, and to the side of the vehicle in order to provide advance warning to approaching vehicles, or to a vehicle that is in the vehicle's blind spot, that the driver of the vehicle intends to make a turn or lane change, with the light pattern preferably restricted from direct observation by a driver of the vehicle. Additionally, the present invention provides a "powerfold" exterior mirror system which includes a security light that projects a pattern of light adjacent side of the vehicle and fans the light outwardly from the vehicle to provide a security zone, which is optionally adapted to maintain the position of the pattern of light even when the exterior rearview mirror assembly is moved between its normal extended operating position to a folded position. It is quite common in vehicles in many European countries to have electrically retractable or "powerfold" mirrors.

According to one form of the invention, an exterior mirror system for a vehicle includes an exterior mirror assembly, which includes a reflective element, a housing for the reflective element, and a positioning device for adjusting the position of the reflective element in the housing. The mirror assembly is adapted to mount to the vehicle and includes at least one signal light. The signal light includes a light source and a light conduiting member. The light conduiting member is oriented for facing at least rearward of the vehicle and is adapted to project a pattern of light from the housing which extends at least rearwardly of and laterally from the vehicle and to restrict the light from extending into the vehicles so that a driver seated in the vehicle does not directly observe the pattern of light. Preferably, the pattern of light comprises an amber colored light to provide a signal.

In one aspect, the light conduiting member includes a light input surface and a light emitting surface. In one form, at least a portion of the light emitting surface is generally orthogonal to the light input surface. In further aspects, the light conduiting member includes a plurality of light conduiting portions with each including a light input surface and a light emitting surface and first and second side walls. The side walls provide internal light reflecting surfaces and direct light from the light source through the light conduiting portions and through said light emitting surfaces. In preferred form, the signal light includes a plurality of light sources, with each being associated with the light conduiting portions.

In other aspects, the light conduiting member includes a first side, a first end, and a second side. The first side defines the light emitting surface and is positioned for facing outward from the housing. The first end defines the light input surface. The second side defines a plurality of internal reflecting surfaces which are arranged to reflect the light from the light source through the first side of the light reflecting member and in the light pattern.

In further aspects, the light pattern includes a plurality of light regions, with each of the light regions having a first leading edge generally parallel with the vehicle and a second leading edge generally angled away from the vehicle. For example, the internal reflecting surfaces may comprise generally angled planar surfaces provided on the second side of the light conduiting member.

In another aspect, the exterior mirror system includes a second light conduiting member which is positioned in a front facing portion of the housing wall of the exterior mirror assembly and directs light at least forwardly of the vehicle. Preferably, the second light reflecting member wraps around an outer portion of the housing wall for directing light laterally with respect to the vehicle.

According to yet another form of the invention, an exterior mirror assembly for vehicle includes a mirror housing having a reflective element and a positioning device for adjusting the position of the reflective element, and a signal light mounted to a portion of the assembly. The signal light includes a light source and a reflector, which includes a plurality of faceted light reflecting surfaces for directing light from the light source forwardly, rearwardly, and laterally of the vehicle. The faceted reflecting surfaces are adapted to restrict light from extending into the vehicle so that a driver seated in the vehicle does not directly observe the pattern of light.

In one aspect, the faceted reflector surfaces may comprise either planar reflective surfaces, concave reflective surfaces, or convex reflective surface. Preferably, at least one of the faceted reflective surfaces comprises a concave reflective surface.

In other aspects, the signal light includes a housing, which includes a recessed portion defining a curvilinear wall. The light source is positioned in the recessed portion, and the reflector is positioned along the curvilinear wall. Light emitted from the light source is directed outwardly from the light module and forwardly, rearwardly, and laterally of the vehicle and is restricted from extending into the vehicle so that the driver seated in the vehicle does not directly observe the light pattern.

According to another form of the invention, the exterior mirror assembly for vehicle includes a powerfold exterior mirror system. The powerfold exterior mirror system includes a folding portion and a non-folding portion, with the non-folding portion being adapted to mount to the vehicle, and the folding portion including a reflective element and being adapted to move between a normal viewing position and a folded position. At least one security light is substantially positioned in either the folding portion or the non-folding portion, which is adapted to project a pattern of light from the exterior mirror assembly to create a lighted security zone in an area adjacent the vehicle.

In one aspect, the security light is positioned in the folding portion of the exterior mirror assembly. In further aspects, the exterior mirror assembly further includes an actuator, which adjusts the position of the security light in the folding portion when the folding portion moves to its folded position whereby the orientation of the lighted security zone remains substantially unaffected by the movement of the folding portion.

In another aspect, the security light is mounted to the non-folding portion of the exterior mirror assembly. In further aspects, the security light includes a housing, a light source positioned to the housing, a light reflecting member supported in the housing, and a cover. The light reflecting member directs light from the light source through the cover. Preferably, the housing is substantially positioned in the non-folding portion of the exterior mirror assembly. Furthermore, the cover is preferably substantially flush with an outer surface of the non-folding portion to reduce the aerodynamic drag of the security light.

It can be appreciated from the foregoing that the exterior mirror system of the present invention permits an approaching vehicle to observe an actuated signal light without the interference from headlights or brake lights. The exterior mirror system may include a unitary module, which is easily installed or removed for repair, or a signal light assembly which is incorporated into the housing of the mirror assembly.

These and other objects, advantages, purposes and features in the invention, will become more apparent from the study of the following description taken in conjunction with the drawings.

DESCRIPTION OF THE PREFERRED EMBODIMENTS

FIG. 1 is a perspective view taken from the front of a mirror assembly (rear of the vehicle) incorporating the invention;

FIG. 2 is a rear view of the mirror assembly in FIG. 1;

FIG. 3 is a top view of the mirror assembly in FIG. 1;

FIG. 4 is the same view of FIG. 1 of an alternative embodiment of the invention;

FIG. 31 is an exploded perspective view of a signal light of FIG. 30;

FIG. 31A is a front elevation of a light source of the signal light of FIG. 31;

FIG. 31B is a side view of the light source of FIG. 31A;

FIG. 33 is a plan view of a fourth embodiment of the exterior rearview mirror assembly of the present invention shown mounted to a vehicle;

FIG. 34 is an enlarged plan view of the exterior rearview mirror assembly of FIG. 33 illustrated in a normal extended position;

FIG. 35 is an enlarged plan view of the exterior mirror assembly of FIG. 33 in a folded position;

FIG. 37 is an elevation view of one the exterior rearview mirror assemblies of FIG. 33;

FIG. 38 is an elevation view of a fifth embodiment of the exterior rearview mirror assembly of the present invention;

FIG. 39 is a plan view of a vehicle with foldable driver and passenger side rearview mirror assemblies incorporating another embodiment of a ground illuminating light of the present invention illustrating a light pattern on the ground when the mirror assemblies are in their normal use position;

FIG. 40 is a plan view of the vehicle of FIG. 39 illustrating a second light pattern when the exterior mirror assemblies are in folded positions;

FIG. 41A is a perspective view of the exterior mirror assembly of FIG. 39;

FIG. 41B is a perspective view of the exterior mirror assembly of FIG. 40 in the folded position;

DETAILED DESCRIPTION OF THE PREFERRED EMBODIMENTS

Figure 5:
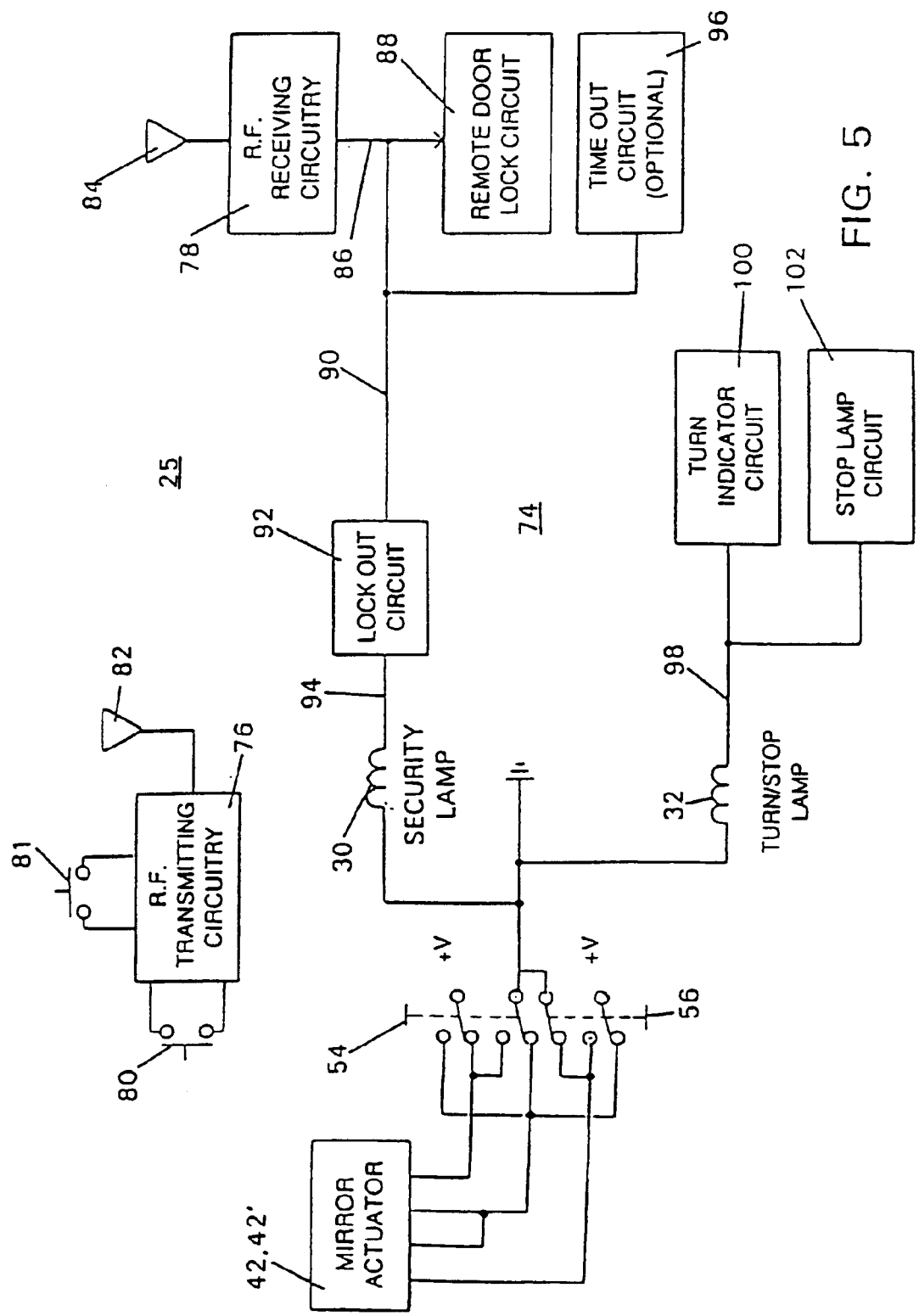
FIG. 5 is a block diagram of a control system according to the invention.

Referring now specifically to the drawings, and the illustrative embodiments depicted therein, a vehicle personal security lighting system 25 includes an exterior mirror assembly 26 having a conventional reflectance element 28, a security light 30, preferably white, or clear, and a signal light 32, preferably red, incorporated in a housing, or casing, 34. Casing 34 is connected by a neck 36 to a stationary panel or sail 38 adapted for incorporation with the forward portion of the vehicle side window assembly, and which mounts mirror assembly 26 to the door of a vehicle 40 (see FIG. 10). Reflectance element 28 may be any of several reflectors, such as glass coated on its first or second surface with a suitable reflective layer or layers, such as those disclosed in U.S. Pat. No. 5,179,471, the disclosure of which is hereby incorporated by reference herein, or an electro-optic cell including a liquid crystal, electrochromic, or electrochemichromic fluid, gel or solid-state compound for varying the reflectivity of the mirror in response to electrical voltage applied there across as disclosed in U.S. Pat. No. 5,151,824, the disclosure of which is hereby incorporated by reference herein.

Figure 7:
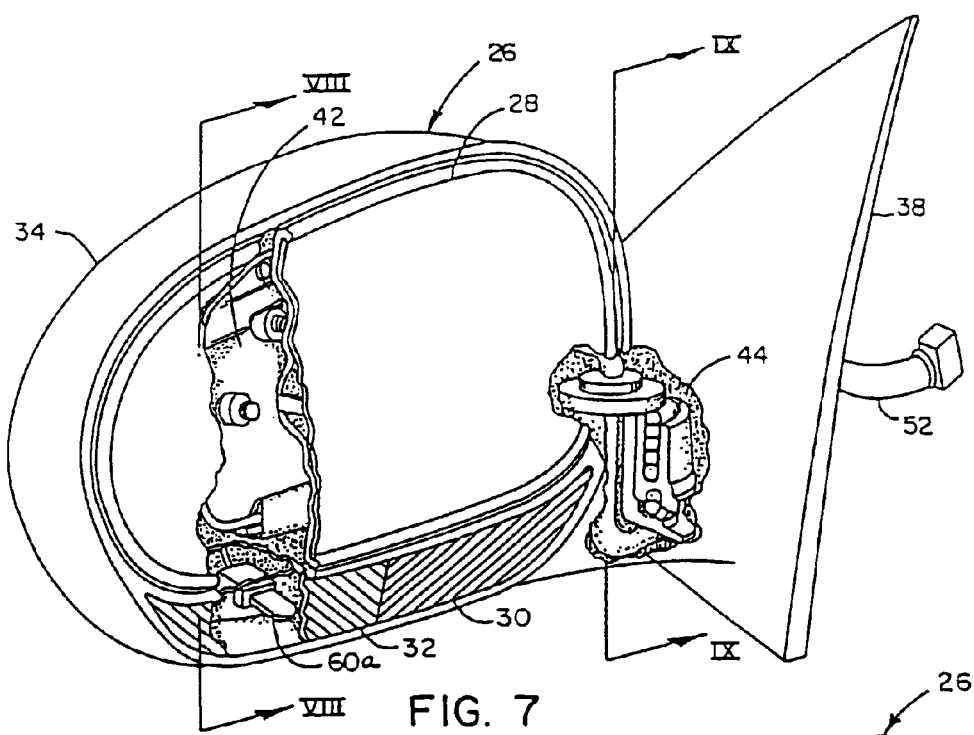
FIG. 7 is a breakaway perspective view of the system in FIG. 1 revealing internal components thereof.
Figure 9:
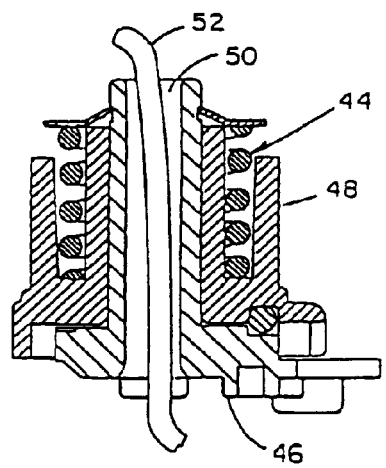
FIG. 9 is a sectional view taken along the lines IX—IX in FIG. 7.
Figure 8:
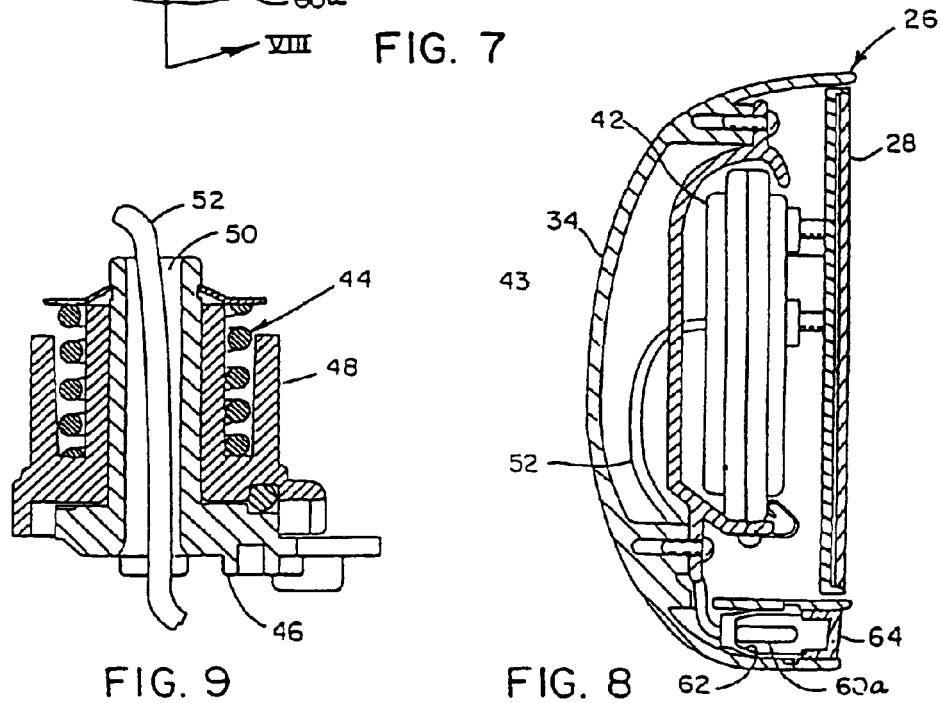
FIG. 8 is a sectional view taken along the lines VIII—VIII in FIG. 7.
Figures 19, 20:
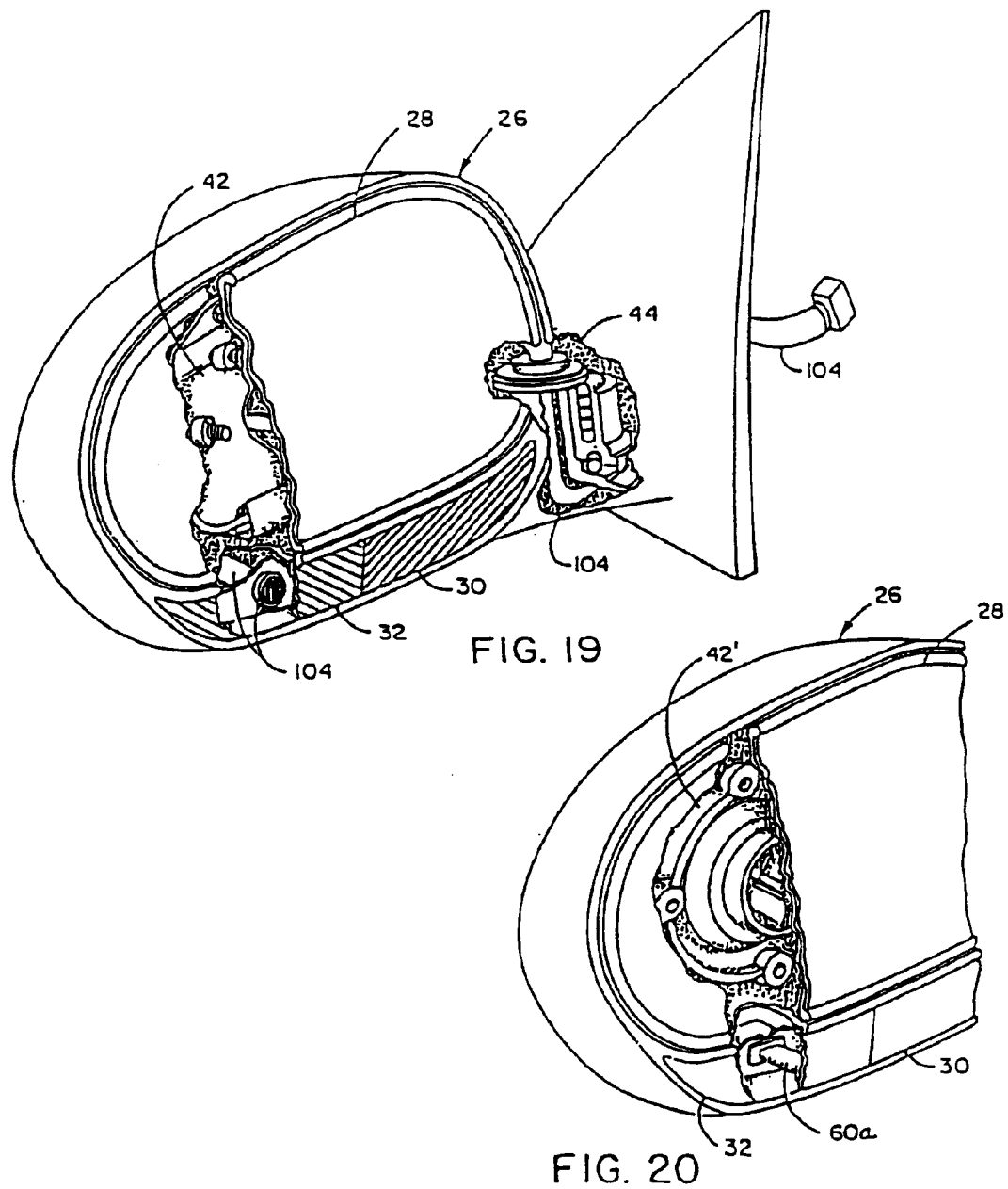
FIG. 19 is the same view as FIG. 7 of a fourth alternative light source.
FIG. 20 is the same view as FIG. 7 of the invention embodied in an alternative mirror structure.

With reference to FIGS. 7 and 8, as is conventional, reflectance element 28 is mounted to a bracket 43 by an actuator 42. Casing 34 is mounted to bracket 43. Actuator 42 provides remote positioning of reflectance element 28 on two orthogonal axes. Such actuators are well known in the art and may include a jackscrew-type actuator 42 such as Model No. H16-49-8001 (right-hand mirror) and Model No. H16-49-8051 (left-hand mirror) by Matsuyama of Kawagoe City, Japan, as illustrated in FIG. 7, or a planetary-gear actuator 42' such as Model No. 540 (U.S. Pat. No. 4,281,899) sold by Industrie Koot BV (IKU) of Montfoort, Netherlands, as illustrated in FIG. 20. As is also conventional, the entire casing 34 including actuator 42, 42' is mounted via bracket 43 for breakaway motion with respect to stationary panel 38 by a breakaway joint assembly 44. Breakaway joint assembly 44 (FIG. 9) includes a stationary member 46 attached to vehicle 40, a pivoting member 48 to which bracket 43 and casing 34 are attached, and a wire-way 50 through which a wire cable 52 passes. Wire cable 52 includes individual wires to supply control signals to actuator 42, 42', as well as signals to control the level of reflectivity, if reflective element 28 is of the variable reflectivity type noted above, such as an electrochromic mirror. Power may also be supplied through cable 52 for a heater (not shown) as disclosed in U.S. Pat. No. 5,151,824 in order to evaporate ice and dew from reflective element 28.

With reference to FIG. 5, actuator 42, 42' receives a first set of reversible voltage signals from a switch 54, in order to bidirectionally pivot in one axis, and a second set of reversible signals from a switch 56, in order to bidirectionally pivot in the opposite axis, as is conventional. Switches 54 and 56 are actuated by a common actuator (not shown) that is linked so that only one of the switches 54 and 56 may be actuated at a time. In this manner, actuator 42, 42' may utilize one common conductor for both switches 54, 56.

Figure 10:
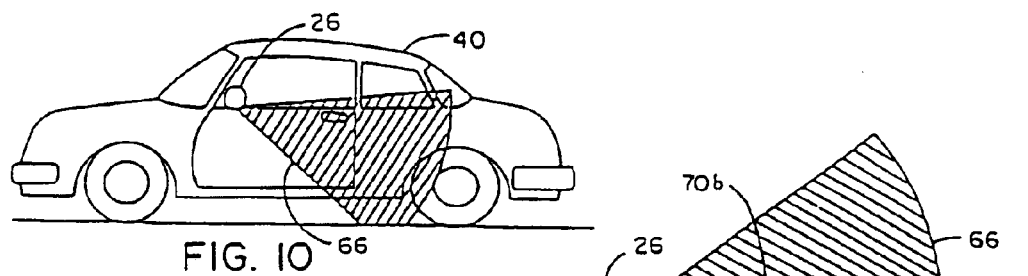
FIG. 10 is a side elevation of a vehicle illustrating the security zone light pattern generated by a security light according to the invention.
Figure 11:
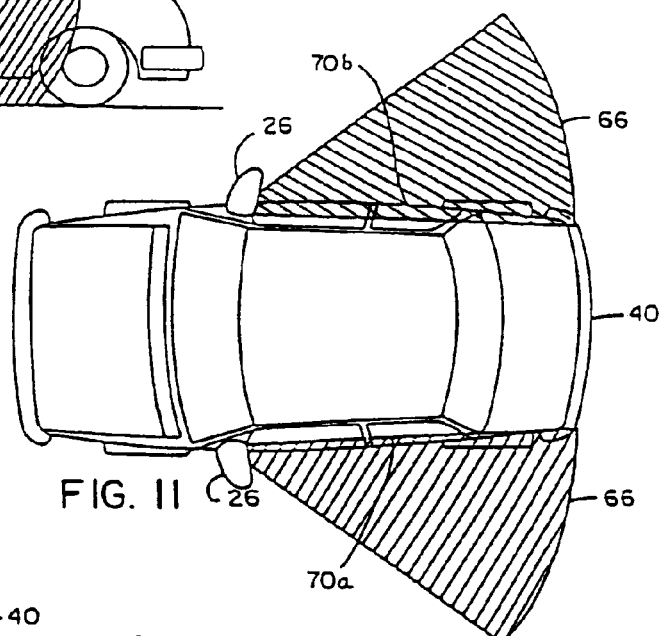
FIG. 11 is a top plan view of the vehicle and light pattern in FIG. 10.
Figure 12:
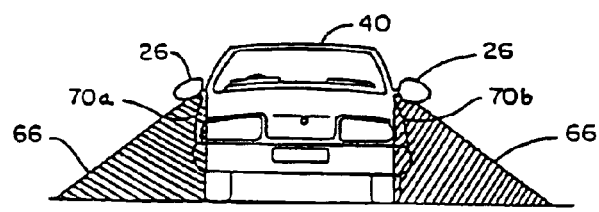
FIG. 12 is a rear elevation of the vehicle and light pattern in FIG. 10.

Each of the security light 30 and signal light 32 includes a light source 60 and reflector 62 behind a lens 64 (FIG. 8). Light source 60, reflector 62 and lens 64 are designed for security light 30 to project a pattern 66 of light, such as white light, through a clear, non-filtering lens, in order to establish a security zone around the vehicle (FIGS. 10–12). Pattern 66 extends rearward from mirror assembly 26. Vertically, pattern 66 contacts the ground at 68 in the vicinity of entry and exit by the vehicle occupants (FIGS. 10 and 12). Laterally, pattern 66 fans out into contact with the side 70a, 70b of the vehicle. This contact washes the sides of the vehicle to reflect the light in order to further illuminate the area in order to establish the security lighting zone (FIGS. 11 and 12). In a preferred embodiment, pattern 66 extends rearwardly from mirror assembly 26 without projecting any portion of the pattern forwardly of the mirror assembly.

Figure 13:
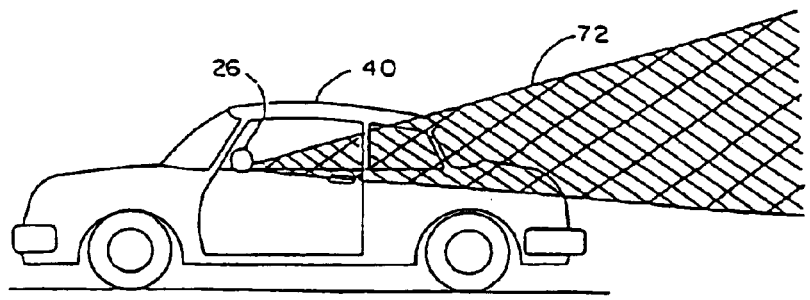
FIG. 13 is a side elevation of a vehicle illustrating the light pattern generated by a signal light useful with the invention.
Figure 14:
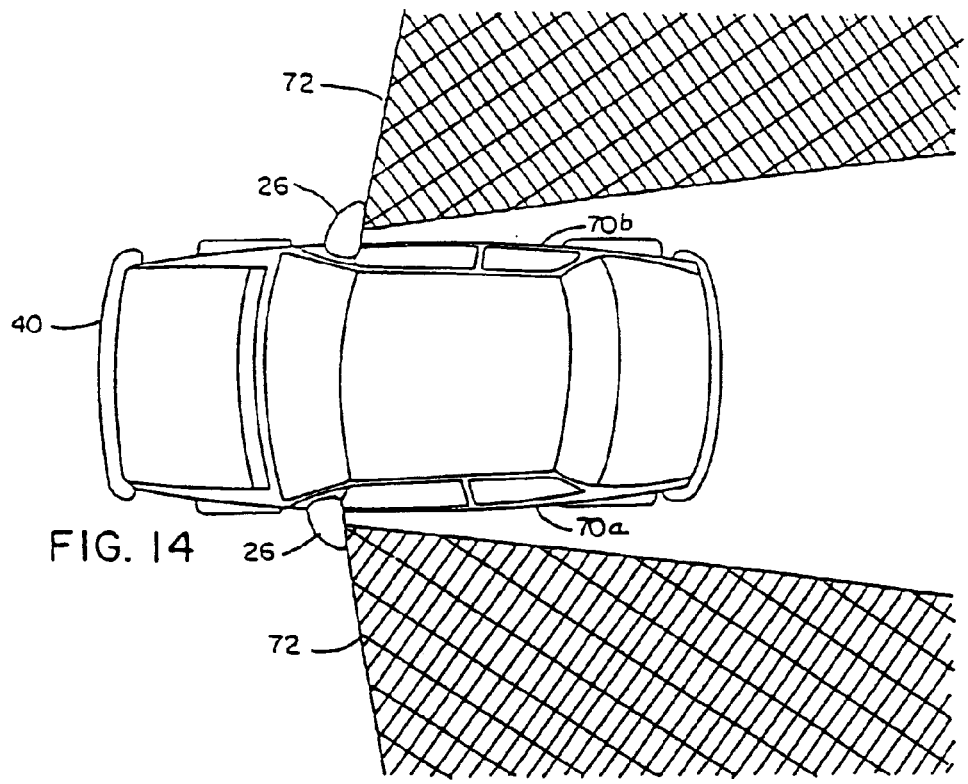
FIG. 14 is a top plan view of the vehicle and light pattern in FIG. 13.
Figure 15:
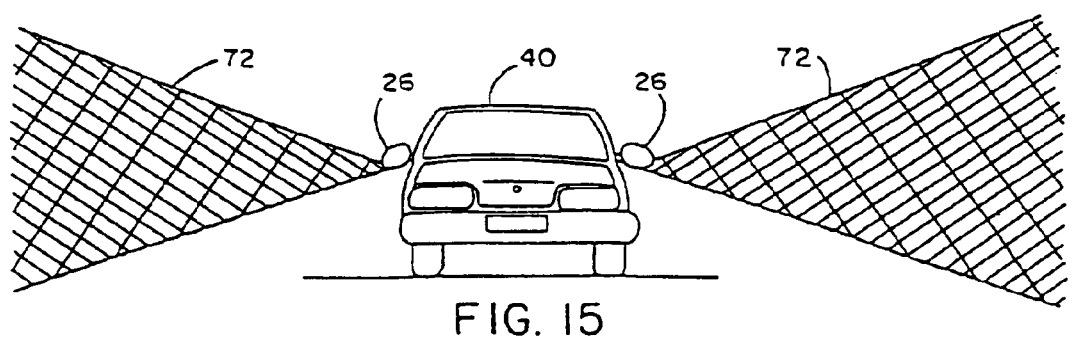
FIG. 15 is a rear elevation of the vehicle and light pattern in FIG. 13.

Signal light 32 generates a light pattern 72, which is directed generally horizontally rearwardly of vehicle 40 (FIGS. 13–15). Pattern 72 is laterally directed substantially away from side 70a, 70b of vehicle 40 so that the driver of vehicle 40 does not directly intercept pattern 72, although a minor intensity (such as 10%) of the pattern is intercepted by the driver in order to provide awareness of the actuating of the signal light. Pattern 72 fans laterally away from side 70a, 70b to an extent that is parallel the face of reflectance element 28, which is substantially perpendicular to side 70a, 70b (FIG. 14). Thus, the driver of another vehicle (not shown) passing vehicle 40 on the left or right side of vehicle 40 will intercept pattern 72 while the vehicle is behind and beside vehicle 40. Although, in an illustrated embodiment, lens 64 of signal light 32 is substantially planar, lens 64 of signal light 32 could be made to wrap around the outward side of casing 34 in order to function as a side marker for the vehicle as is required in some European countries.

Vehicle mirror assembly security system 25 is actuated by a control system 74 (FIG. 5). Control system 74 includes means for actuating security light 30 including a remote transmitting device 76 and a stationary receiving device 78. Transmitting device 76 may be remotely carried by the vehicle operator and includes switches 80 and 81 in order to actuate the transmitting circuitry to transmit a signal form antenna 82, which is received by antenna 84 of receiving device 78. Receiving device 78 is mounted in the vehicle, such as in the vehicle trunk compartment, and includes an output 86 in order to operate remote door lock circuit 88, as is conventional. Output 86 is, additionally, provided as an input 90 of a lockout circuit 92, whose output 94 is supplied to security lamp 30. Input 90 may additionally be actuated by a timeout circuit 96, which is conventionally supplied in a vehicle in order to dim the interior lights, following a slight delay, after the occurrence of an event, such as the opening and closing of the doors of the vehicle. Signal light 32 is actuated on line 98 from either a turn indicator circuit 100 or a stop lamp indicator circuit 102, both of which are conventionally supplied with vehicle 40.

In operation, when the operator actuates switch 80 of transmitting device 76, receiving device 78 produces a signal on output 86 in order to cause remote door lock circuit 88 to unlock the doors. Alternatively, actuation of switch 81 on remote transmitting device 76 causes receiving device 78 to produce a signal on output 86 to cause remote door lock circuit 88 to lock the vehicle doors. The signal on output 86 actuates security lamp 30 provided that lockout circuit 92 does not inhibit the signal. Lockout circuit 92 responds to operation of the vehicle in order to avoid actuation of security lamp 30 when the vehicle is in motion. Such lockout circuits are conventional and may be responsive to placing of the vehicle transmission in gear of sensing of the speed of the vehicle, or the like. Security lamp 30 is also actuated, in response to interior lighting device timeout circuit 96, whenever the interior lights of the vehicle are being actuated by timeout circuit 96, provided that lockout circuit 92 does not inhibit the signal from security lamp 30. This is provided in order to allow security lamp 30 to be actuated in response to the entry to, or exit from, vehicle 40 without the operator utilizing transmitting device 76 to lock or unlock the doors. Signal lamp 32 is actuated in response to turn indicator circuit 100 whenever the operator moves the indicator stick in the direction of that particular signal lamp 32. Signal lamp 32 may additionally be actuated from stop lamp circuit 102 in response to the driver actuating the vehicle's brakes.

In the embodiment illustrated in FIGS. 1 and 5, lens 64 of signal lamp 32 is adapted to filter the light provided from lamp 32 so as to be red and is provided for vehicles 40 in which the stop lamps and rear turn indicator lamps are, likewise, red. Because signal lamp 32 shines red, pattern 72 is restricted from extending forward of the vehicle. This is in order to comply with regulations prohibiting red lights from causing confusion with emergency vehicles by shining forward of the vehicle.

Figure 6:
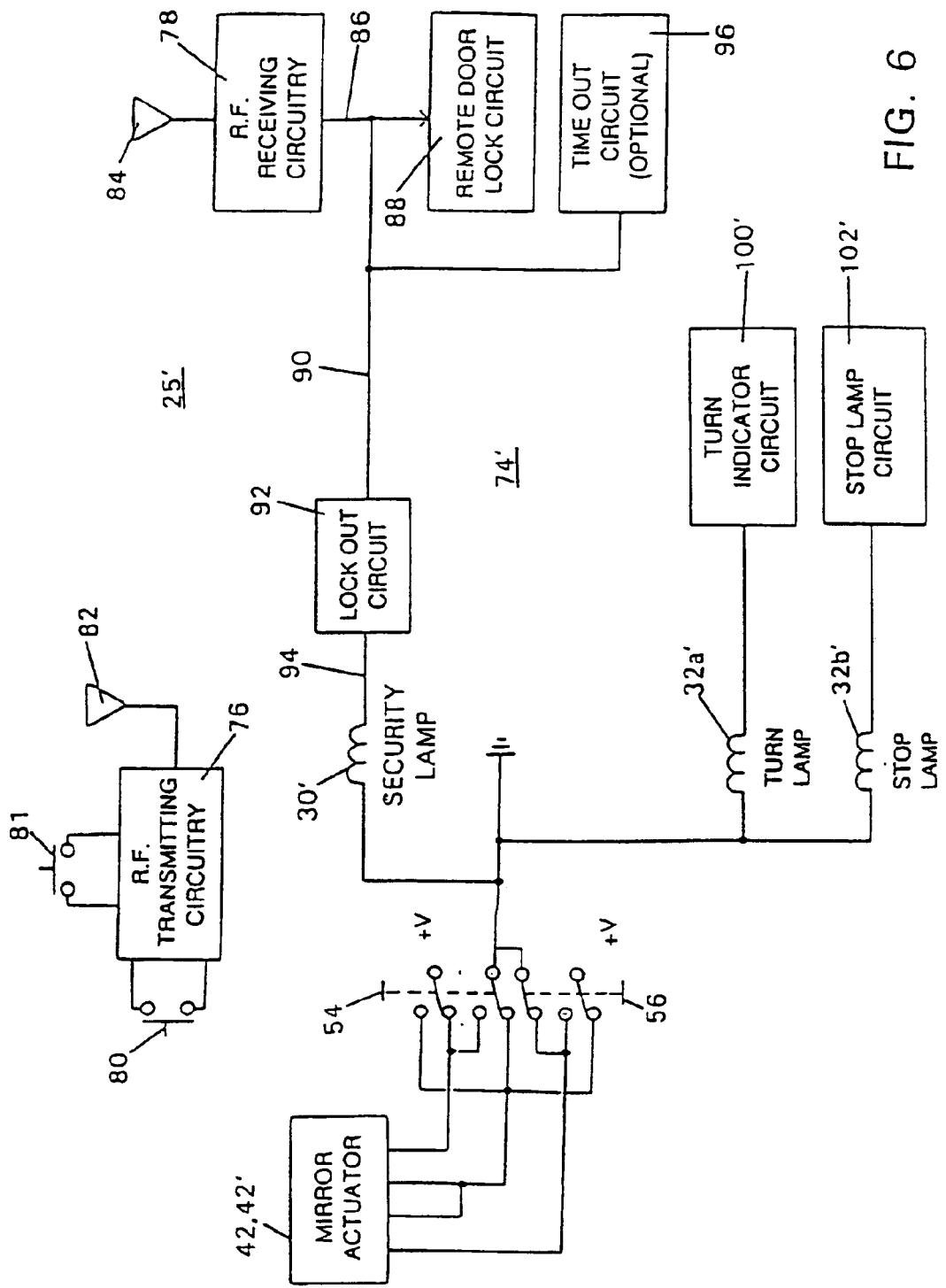
FIG. 6 is a block diagram of an alternative embodiment of a control system according to the invention.

For vehicles having red stoplights and amber turn indicators in the rear, a vehicle mirror security assembly 25' includes an exterior mirror assembly 26' and a control system 74' (FIGS. 4 and 6). Exterior mirror assembly 26' includes a security light 30', preferably white or clear, and a pair of signal lights 32a' and 32b'. Signal light 32a' is amber and is actuated directly from turn indicator circuit 100'. This amber color can be provided either by an amber light bulb or source, or a filtering lens providing an amber color. Signal light 32b' is red and is actuated directly from stop lamp circuit 102'. Each of the light patterns generated by signal lights 32a' and 32b' substantially correspond with light pattern 72. The light pattern generated by security light 30' is substantially equivalent to pattern 66. With the exception that turn signal indicator circuit 100' actuates signal light 32a' and stop lamp circuit 102' actuates signal light 32b', control system 74' operates substantially identically with control circuit 74.

Figure 16:
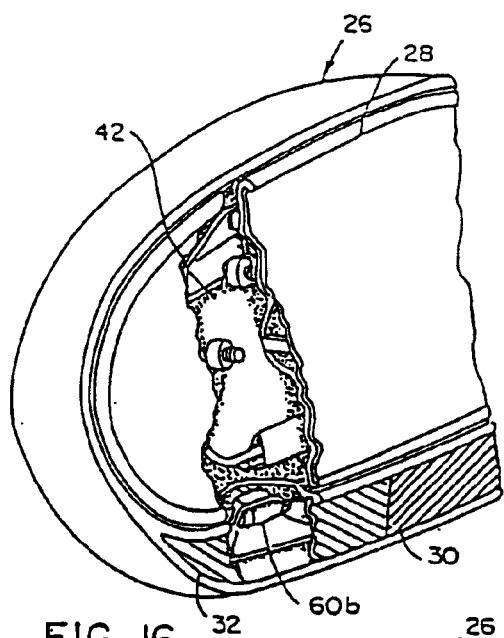
FIG. 16 is the same view as FIG. 7 of a first alternative light source according to the invention.
Figure 17:
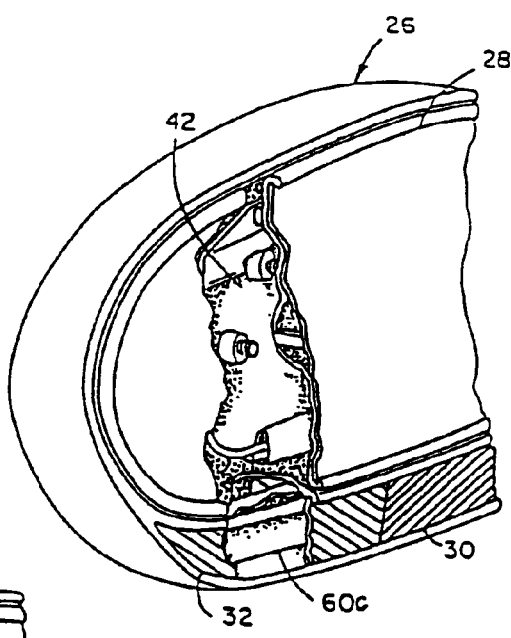
FIG. 17 is the same view as FIG. 7 of a second alternative light source.
Figure 18:
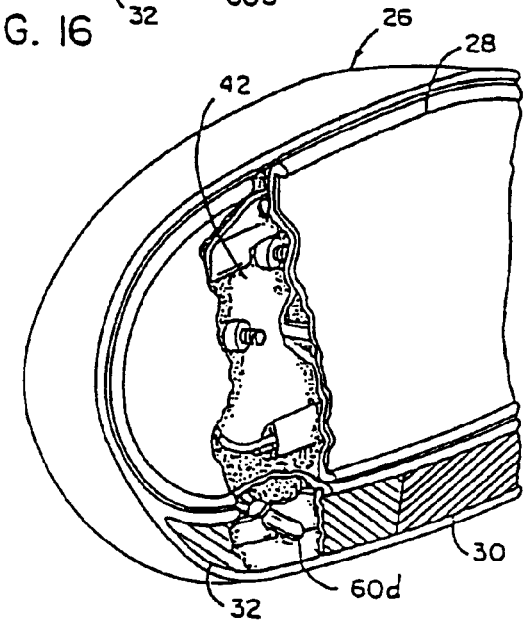
FIG. 18 is the same view as FIG. 7 of a third alternative light source.

In the illustrated embodiment, light source 60, for both security light 30 and signal light 32, may be supplied as a conventional incandescent or halogen lamp 60a (FIG. 7). Alternatively, a conventional incandescent fuse lamp 60b may be used (FIG. 16). Alternatively, a vacuum fluorescent lamp 60c, which is available in various colors, may be used (FIG. 17). Alternatively, a light emitting diode 60d may be used (FIG. 18). As yet a further alternative, a fiber optic bundle 104 forming a light pipe may be positioned to discharge light behind lens 64. Fiber optic bundle 104 passes through breakaway joint 44 in wire-way 50 in order to transmit light from a source (not shown) within vehicle 40. By way of example, lens 64 may be supplied as a segmented lens, a prismatic lens, or a Fresnel lens in order to generate light patterns 66 and 72. Bracket 43 and breakaway joint 44 are marketed by Donnelly Corporation, the present assignee, of Holland, Mich. The remote actuator composed of remote transmitting device 76 and stationary receiving device 78 may be radio frequency coupled, as is conventional. Alternatively, they may be infrared coupled as illustrated in U.S. Pat. No. 4,258,352.

Although the invention is illustrated in a mirror assembly utilizing an automatic remote actuator, it may also be applied to manual remote actuators and handset actuators. As previously set forth, reflectance element 28 may be conventional or may be supplied as an electrochromic self-dimming mirror. Although the invention is illustrated with breakaway joint 44, the invention may also be applied to mirrors that are rigidly mounted to the vehicle.

Figure 21:
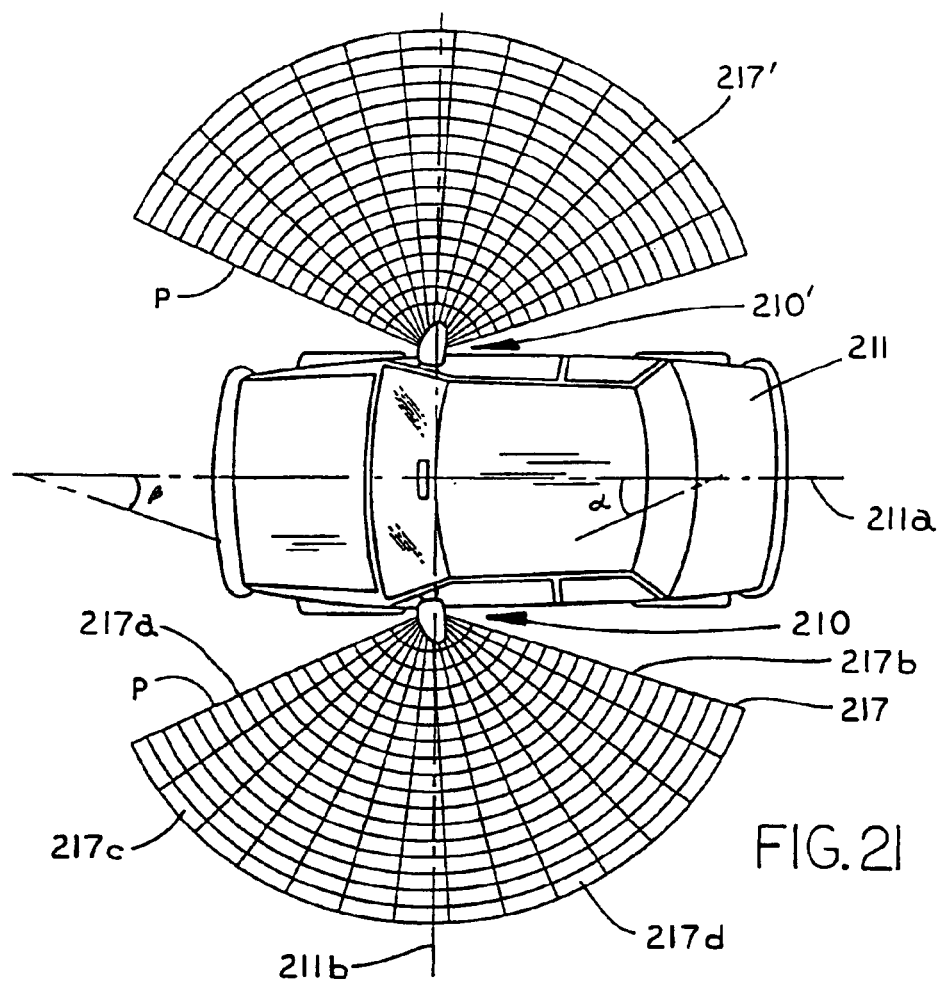
FIG. 21 is a plan view of a vehicle with an exterior rearview mirror assembly of the present invention mounted to the vehicle illustrating the light pattern from a signal light mounted in the exterior rearview mirror assembly.
Figure 22:
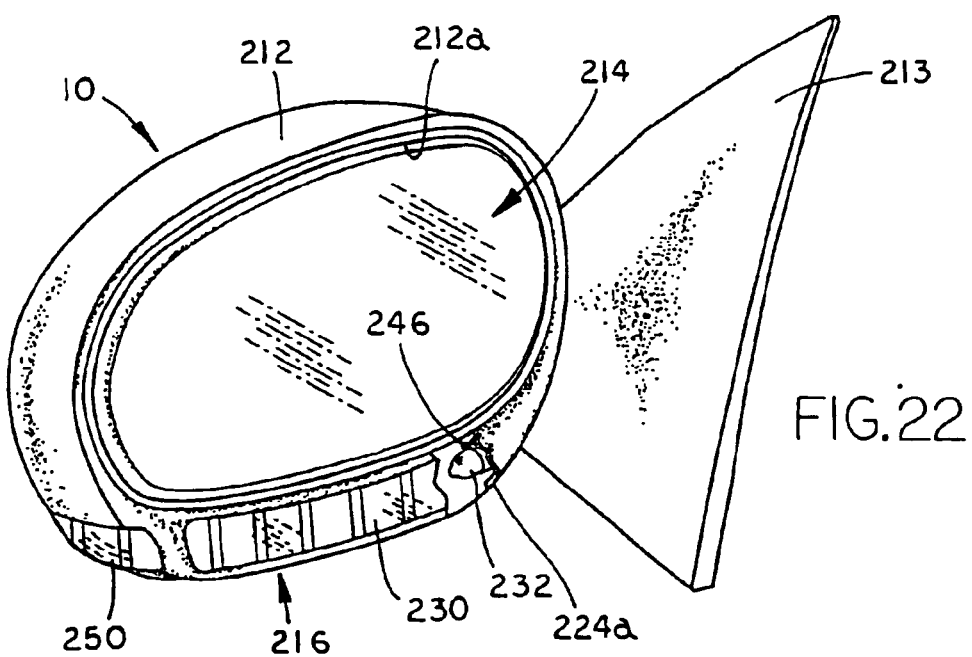
FIG. 22 is a perspective view of the driver's side exterior rearview mirror assembly of FIG. 21.
Figure 23:
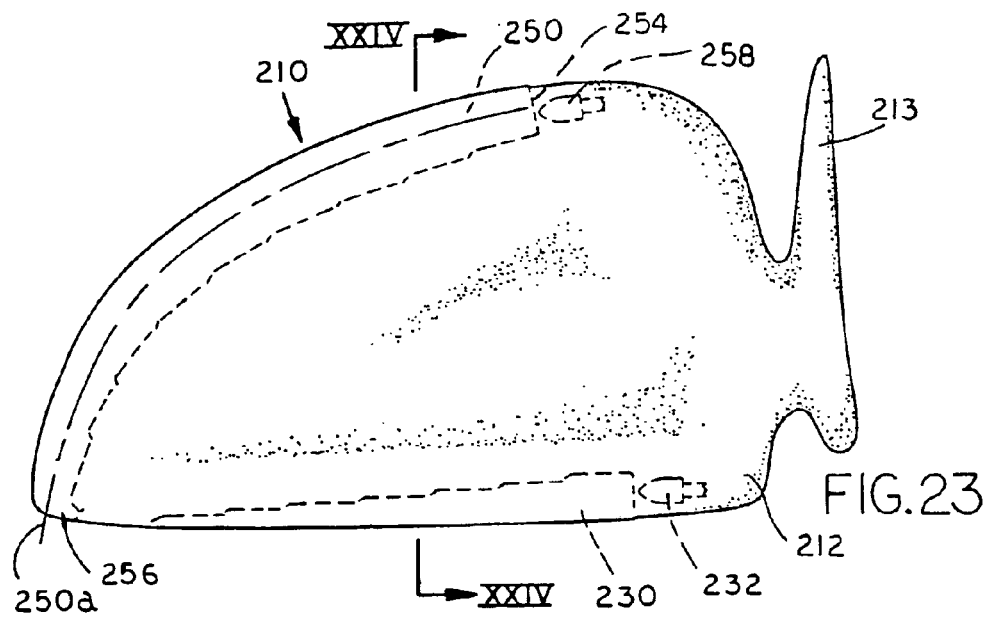
FIG. 23 is a top plan view of the exterior rearview mirror assembly of FIG. 22.

Referring to FIGS. 21–23, the numeral 210 generally designates a driver's side exterior mirror assembly of the present invention, with the numeral 210' generally designating a passenger's side exterior mirror assembly of the present invention which is preferably a mirror image of driver's side exterior mirror assembly 210. Exterior rearview mirror assembly 210 includes a mirror casing or housing 212, which includes a sail 213 that is adapted to mount on a vehicle, a reflective element 214, which is supported in casing 212, and a signal light 216 which is also supported in casing 212. Signal light 216 is adapted to direct light into the blind spot of the driver and, preferably, provides a light forwardly and rearwardly of the vehicle so that vehicles approaching the vehicle may observe the signal light. Additionally, signal light 216 is adapted to project light laterally with respect to the vehicle to provide a side light and so function as a side marker. Furthermore, it should be understood that light pattern 217 is generally cone shaped and may project above and below the horizontal plane extending through mirror assembly 210 similar to the illustration in FIG. 15 and preferably projects light above and below the horizontal plane by in a range of about 5° to about 25° and, more preferably, about 15°. As will be more fully described, signal light 216 is preferably adapted to direct the light in a light pattern 217 (with passenger side exterior rearview mirror assembly 210' having a mirror image light pattern 217'), such that the light does not extend into the cabin of the vehicle to distract the driver of the vehicle. Furthermore, by projecting light rearwardly, forwardly, and to the side of the vehicle, approaching vehicles, whether from the forward direction of the vehicle or from the rearward direction of the vehicle or vehicles that are entering the blind spot of the vehicle, can observe the signal light and have advanced notice that the driver of the vehicle intends to make a lane change or turn.

Rearview mirror assembly 210 may comprise a fixed position exterior rearview mirror assembly or may comprise a break-away rearview mirror assembly, which moves between a normal operating position, in which the rearview mirror assembly is extended from the vehicle, to a folded position against the body of the vehicle when the exterior rearview mirror assembly 210 is impacted with sufficient force. Reference is made to the previous embodiment, exterior mirror assembly 26, for one example of a break-away rearview mirror assembly.

Casing 212 is cup shaped and includes a rearwardly facing opening 212a in which reflective element 214 is supported. Casing 212 is preferably injection molded from a suitable plastic, such as nylon, acrylonitrile butadiene styrene (ABS) or suitable resinous plastic, or the like, which is commercially available under the trademark TERLURAN KR2889®, by BASF Company of Wyandotte, Mich. Alternately, other resinous, melt processible plastics or moldable materials such as mineral-filled or glass filled nylon or polyester and polypropylene could be used to form case 212. A suitable nylon is 13% glass modified nylon 6:6 sold as ZYTEL 71G13L® by I.E. DuPont de Nemours & Company of Wilmington, Del., or PA123G13BK-47 by Bay Resins Inc. of Millington, Md. A suitable polypropylene is TENITE P6M4Z-007® by Eastman Chemical Products, Inc., Kingsport, Tenn. Alternately, casing 212 may comprise a fiber reinforced nylon plastic, thermoplastic, or polypropylene or other similar thermoplastic or thermoset materials.

Figure 24:
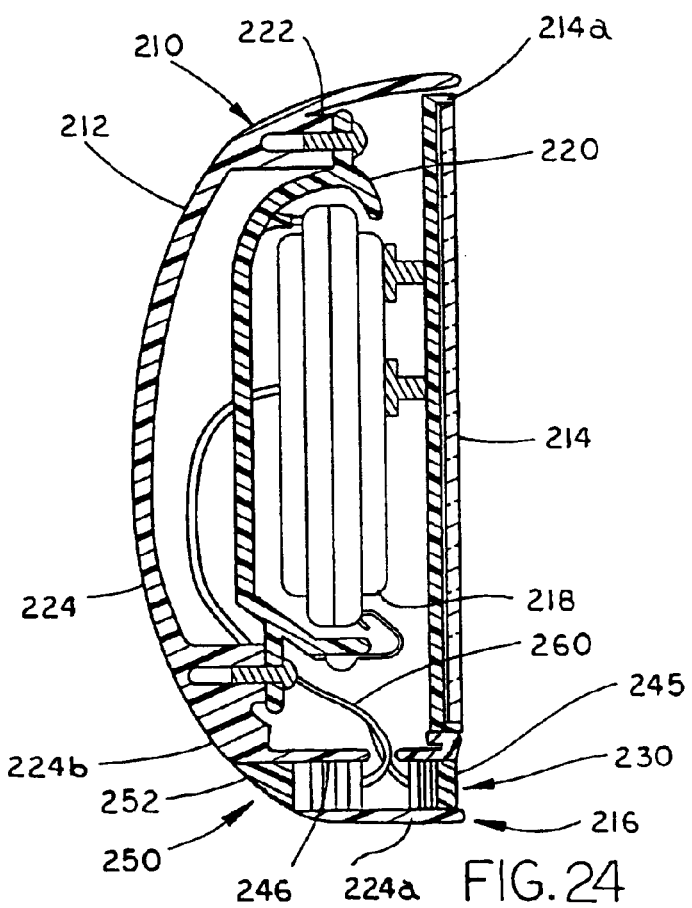
FIG. 24 is a cross-section view taken along line XXIV—XXIV of FIG. 23.
Figure 25:
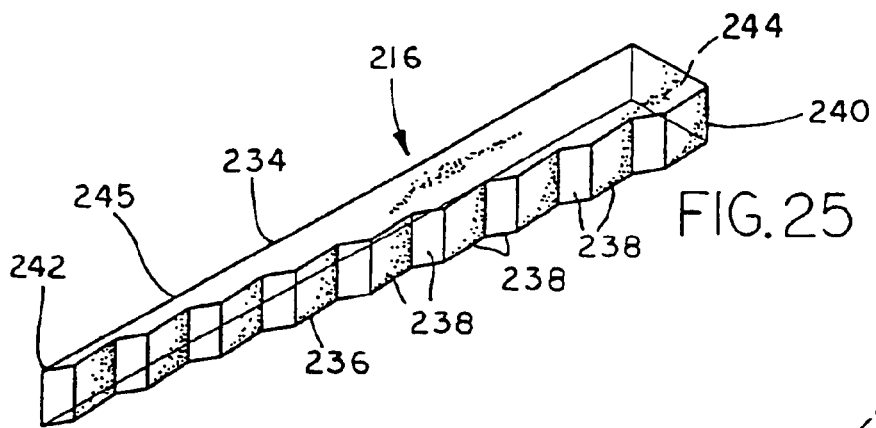
FIG. 25 is a perspective view of a light reflecting member of the exterior rearview mirror assembly of FIGS. 22 and 23.

As described above, reflective element 214 is supported in casing 212. As best seen in FIG. 24, reflective element 214 is mounted to a backing plate 214a which is supported by a positioning device, such as an actuator 218, which provides adjustment for reflective element 214. Actuator 218 is supported on a mounting bracket 220, which in turn is secured to casing 212 on mounting bosses 222 provided on casing wall 224. In the illustrated embodiment, actuator 218 comprises an electrical actuator, which pivots reflective element 214 in casing 212. Preferably, actuator 218 comprises dual axis positioning device that permits adjustment of the position of the reflective element 214 and backing plate 214a about both vertical and horizontal axes as is known in the art. It should be understood, however, other positioning devices may be used including manually operated actuators, a remote manually operated actuators, such as a BODEN cable actuator, or the like.

Reflective mirror element 214 may comprise a conventional non-electro optic planar or convex mirror element including a metallic reflector coated glass substrate, such as with a thin chromium or chromium alloy reflector coating, or a non-metallic reflector layer, such as a dichroic layer as described in U.S. Pat. No. 5,207,492 to Roberts et al. or a reflector comprising a silicon reflective layer such as described in U.S. Pat. No. 5,535,056 to Caskey et al., which are herein incorporated by reference in their entireties. Alternatively, reflective element 214 may comprise a variable reflective electro optic element, such as electrochromic mirror element comprising one of several types of electrochromic elements, for example an element of the electrochemichromic type, which is disclosed in U.S. Pat. No. 5,140,455 issued to Varaprasad et al., or may be of the solid state type such as disclosed in U.S. Pat. No. 4,712,879 issued to Niall R. Lynam et al., U.S. patent application Ser. No. 08/023,675, filed Feb. 22, 1993, by Varaprasad et al., U.S. Pat. No. 6,002,511, filed Feb. 8, 1994, by Varaprasad et al., and U.S. patent application Ser. No. 08/238,521, filed Mar. 5, 1994, by Varaprasad et al., now U.S. Pat. No. 5,668,663, all commonly assigned with the present application to Donnelly Corporation of Holland, Mich., the disclosures of which are herein incorporated by reference in their entireties. Such electrochromic elements comprise an electrically responsive electrochromic medium that modulates reflectivity from a reflective element. Such electrochromic mirror elements are continuously variable and exhibit multiple reflectant states as the voltage applied thereto is varied. Alternately, reflective element 214 may comprise other electro optic mirror elements such as a liquid crystal mirror and the like. Where reflective element 214 comprises an electrochromic mirror element, the electrochromic mirror element is preferably driven by signals produced by a variable reflectant system of the type disclosed in U.S. patent application Ser. No. 08/316,047 for a "Modular Variable Reflectant Mirror Assembly", filed Sep. 30, 1994, by Kenneth L. Schierbeek et al., now U.S. Pat. No. 5,659,423 which is herein incorporated by reference in its entirety.

It should be understood, although not described herein, that one or more electrical or electronic components may be mounted in casing 212, such as the interface transaction system described in U.S. pending Pat. application entitled A VEHICLE MOUNTED REMOTE TRANSACTION INTERFACE SYSTEM filed by Martin DeVries and Niall R. Lynam on Apr. 8, 1998 Ser. No. 09/057,428, now U.S. Pat. No. 6,158,655, and/or an electronic module, which may include one or more electrical or electronic devices, such as antennas and circuitry for rain sensors, heating elements, and the like, as described in U.S. Pat. application entitled MODULAR REARVIEW MIRROR ASSEMBLY INCLUDING ELECTRONIC MODULE, Ser. No. 08/702,228 which was filed Aug. 23, 1996, by Niall Lynam et al., now U.S. Pat. No. 6,019,475, and which are commonly assigned to Donnelly Corporation of Holland, Mich., the disclosures of which are incorporated by reference herein in their entireties.

Figure 26:
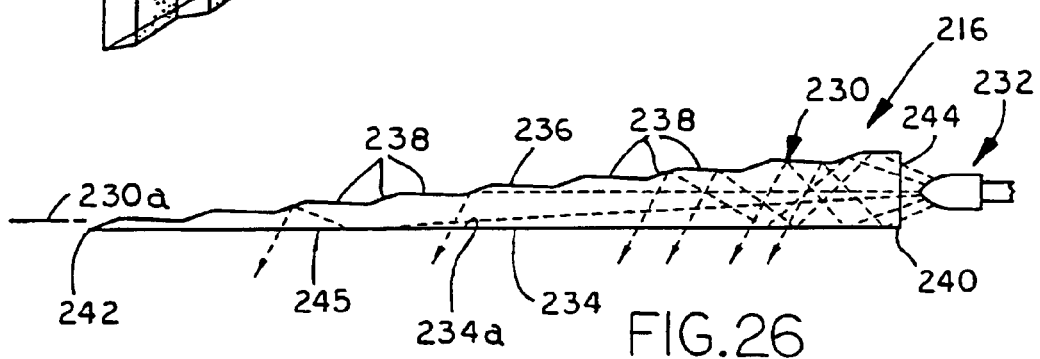
FIG. 26 is a top plan view of the light reflecting member of FIG. 25.

As best seen in FIGS. 22 and 26, signal light 216 is positioned in a lower portion or bottom rim of casing 212 and includes a light conduiting member or light pipe 230 and a light source 232. The color of the light emitted from signal light 216 is preferably amber, yellow-amber, or amber-red, depending on its application and may be generated by a boot or cover, a filter, a reflector which surrounds the light source, the light source or the light pipe or a combination of one or more of the aforementioned devices. For example, light source 232 may produce, for example an amber light from a coating on the light source bulb or from a gas enclosed in the bulb or from the light producing element of the light source. In addition, signal light 216 preferably produces a light intensity of at least about 0.3 and in the range of about 0.3 to about 200 candela, more preferably, in a range of about 0.6 to about 150 candela, and most preferably, in a range of about 1.0 candela to about 25 candela, such that signal light 216 preferably meets the specification for the applicable automobile industry standards such as Japanese Industrial Standard (JIS) 5500; ECE Reg. 48; EEC No. 76/759; and/or E/ECE/324 Reg. No. 6. Moreover, signal light 216 may produce a variable light pattern intensity. For example, referring to FIG. 21, in the region 217c of light pattern 217 which is forward of transverse axis 211b, the light intensity may have one intensity value, while the region 217d rearward of transverse axis 211b may include another light intensity value. Furthermore, each region 217c or 217d may have a variable intensity pattern. For example, the portion of the region 217c or 217d nearest to axis 211b may have a higher light intensity than portions of the region 217c or 217d angled further away from axis 211b. In this manner, signal light 216 is visible to persons on the road who are approaching the vehicle from the forward or rearward direction or persons located adjacent the vehicle.

Light pipe 230 is preferably formed, such as by molding, from a plastic, such as polycarbonate, acrylic or the like, and is, therefore, substantially rigid. Alternately, light pipe 230 may comprise a flexible bundle of individual fibers or an individual flexible fiber. Furthermore, light pipe 230 is adapted to transmit or direct light from light source 232 along a longitudinal axis 230a of light pipe 230 and reflect the light from light source 232 as it extends through the light pipe in directions generally lateral to the longitudinal axis 230a of light pipe 230, as will be more fully described below.

Referring to FIG. 26, light pipe 230 includes a first side 234, which provides a light emitting surface and is substantially planar, and an opposed side 236 which includes a plurality of faceted surfaces 238. Faceted surfaces 238 provide internal light reflecting surfaces and have a stepped configuration, with the cross-section of light pipe 230 being incrementally reduced from a first end or approximate end 240 to a second end or distal end 242. Light pipe 230 is preferably positioned in casing 212 such that first end 240 is positioned closer to the vehicle than second end 242 and such that first side 234 is oriented facing outwardly from casing 212. Moreover, light pipe 230 is preferably positioned in casing 212 with minimal protrusion into the slipstream of the mirror assembly so as to reduce the aerodynamic drag and, most preferably, with first side 234 substantially flush with the outer surface of the lower portion or bottom rim of casing 212. First end 240 is substantially planar and generally orthogonal to first side 234 and defines a light input surface 244. Light source 232 is positioned adjacent light input surface 244 and preferably in substantially close proximity to light input surface 244 so that a high percentage, if not all, light emitted from light source 232 is directed into light pipe 230. Optionally, light source 232 may be optically coupled to light input surface 244 by, for example, an optical adhesive.

As described above, first side 234 of light pipe 230 provides light emitting surface 245, through which light from light source 232 is emitted. Again referring to FIG. 26, when light enters light pipe 230 through light input surface 244, the light rays are internally reflected off faceted surfaces 238 and, some of which, are internally reflected off planar surface 234a of first side 234 so that the light from light source 232 is directed laterally through first side 234 and through light emitting surface 245 in directions which are angled with respect to first side 234. In preferred form, the light pattern emitted light pipe 230 includes a plurality of light regions which are angled away from the side of the vehicle to restrict the light from entering into the vehicle. In this manner, light pipe 230 transmits or conduits the light from light source 232. It should be understood that the geometry of light pipe 230 permits light pipe 230 to direct light in a manner that relies on internal reflections within light pipe 230; therefore, no reflective coatings are necessary. Consequently, light pipe 230 is easier and less costly to manufacture. However, it can be appreciated that faceted surfaces 238 may include reflective coatings, such as formed by vacuum metalizing.

As best seen in FIG. 24, light pipe 230 is mounted between a lower or bottom wall portion 224a of casing wall 224 and a flange 246 which extends from a back wall portion 224b of casing wall 224. Similarly, light source 232 is supported between flange 246 and lower portion 224a of casing wall 224 and is positioned adjacent first end 240 of light pipe 230, as described above. It should be understood from the foregoing, that reflective element 214 is independently mounted from light pipe 230 and, therefore, can move independently from light pipe 230, which is preferably mounted in a fixed position in casing 212.

Optionally, signal light 216 includes a second light pipe 250. Light pipe 250 is a similar construction to light pipe 230, except that light pipe 250 includes a curved outer surface 252 which follows the curvature of casing 212 as shown in FIGS. 23 and 24 and which defines a light emitting surface. Light pipe 250 includes a first or approximate end 254, which provides a light input surface, and a second or distal end 256. As best seen in FIG. 23, light pipe 250 wraps around casing 212 to permit light to be reflected generally laterally from exterior rearview assembly 210 to provide a side signal or side marker to cars which are positioned in the blind spot of the vehicle. A second light source 258 is positioned adjacent first end 254 so that light which is emitted from light source 258 is directed along the longitudinal axis 250a of light pipe 250 and laterally with respect to longitudinal axis 250a in a similar manner to light pipe 230.

Preferably, light pipes 230 and 250 direct light in light pattern 217, shown in FIG. 21. Light pattern 217 is defined between leading edges 217a and 217b, wherein leading edge 217a forms an angle α with respect to the vehicle axis 211a of vehicle 211, as measured in a counter clock-wise direction, and leading edge 217b forms an angle β with respect to vehicle axis 211a as measured in a clock-wise direction. These angles vary depending upon the applicable guidelines or specifications of the country in which the vehicle is sold. For example, α may be in a range of about 0° to about 45°. β may be in a range of about 0° to about 15°. In some countries, α may be in a range of about 0° to about 40°, and β may be in a range of about 0° to about 5°.

Light sources 232 and 258 are preferably energized by power lines 260 which extend through flange 246 so that they can be bundled along with other power or communication lines which extend from exterior mirror casing 212 to the interior of the vehicle to couple light sources 232 and 258 to the electrical system of the vehicle. Light sources 232 and 258 may comprise a laser diode, a solid state emitter such as a light emitting diode, an incandescent light source, a fluorescent light source, such as a cold cathode fluorescent light, a phosphorous lamp, a neon light, a discharge lamp, an arc lamp, and an electro-luminescent light, including inorganic or organic electro-luminescent sources.

Optionally, two or more of such light sources may be incorporated into exterior mirror assembly 210 for directing light into the respective light input surfaces 244 and 256 of light pipes 230 and 250, respectively. Furthermore, a plurality of light emitting sources may be grouped to provide a more intense illumination. As described above, a variety of emitting sources may be used as light emitting sources 232 and 258, including but not limited to a very high intensity amber and reddish-orange light emitting diode (LED) sources, such as solid state light emitting diode sources utilizing double hetero-junction AlGaAs/GaAs Material Technology, such as very high intensity LED lamp T-1¾ (5 mm) HLMT-4100/4101, available from Hewlett Packard Corporation, Palo Alto, Calif., for which used transparent substrate aluminum indium gallium phosphide (AlInGaB) Material Technology, commercially available from Hewlett Packard Corporation under the designation T-1¾ (5 mm) HLMT-DL00, HLMT-CH00, HLMT-CL00, HLMT-CH15, HLMT-DH00 or which use InGaAlB Material Technology available from Toshiba Corporation of Laythem, N.Y. such as under the designation TLRH180D. Light emittance colors provided by such solid state sources include orange, yellow, amber, and reddish-orange, preferably without the need for ancillary filters. The preferred solid state light emitting diodes operate at 25° C., or thereabouts, and operate with a forward voltage of about 2 volts to about 5 volts; have a luminance intensity (measured at peak of the spacial radiation pattern which may not be aligned with a mechanical access of the source package) of a minimum at 20 mA current of about 500 to about 5,000 lcd (typically about 700 to about 7,000 mcd); operated at a forward current of about 20 mA to about 50 mA; emit with a dominant wave length (CE Chromaticity diagram) of about 530 nm to about 60 nm; and have a viewing angle to θ½, where θ½ is the off axis angle where the luminance intensity is ½ the peak intensity of about 5° to about 25°.

Alternately, vacuum fluorescent sources such as 12-volt battery driven high luminescent vacuum fluorescent sources may be used. It may also be advantageous to use sources which operate efficiently at about 12 volts or lower since these voltages are particularly suited to conventional motor vehicle electrical systems. Also, ultra high luminescent vacuum fluorescent sources such as those suitable for head set display applications in motor vehicles may be used with appropriate circuitry.

Alternately, non-LED non-incandescent light emitting sources can be used such as electro-luminescent sources or semiconductor laser sources. Electro-luminescent sources may be either inorganic or organic electro-luminescent sources. Light emitting sources 232 and 258, preferably have well defined light patterns, such as a cone of directed light which eliminates the need for reflectors or other separate optical components that direct the light where desired. In addition, light emitting sources 232 and 258 are preferably mounted on or within mirror casing 212 as described previously. Alternately, light sources 232 and 258 may be in the form of a light pipe which directs light from a remote light source located in the vehicle. Such a light pipe may comprise, for example a flexible light pipe such as a fiber optic cable. In which case, the distal end of the fiber optic cable is positioned adjacent the respective light input surfaces 244 and 256 of light pipes 230 and 250.

In the event that the light emitting source comprises a light emitting diode, a resistor is preferably connected in series with a respective light emitting diode to act as a voltage divider so as to reduce the ignition voltage of the vehicle, which is in the range of 9–16 volts (normally 12 volts), for the desired operating voltage of the light emitting diode, which is typically on the order of about one volt to about five volts. Each resistor preferably has a resistance of less than about 1,500 ohms and greater than about 100 ohms, more preferably, less than about 1,000 ohms and greater than about 200 ohms.

Although illustrated herein as being located along the bottom rim of the exterior trim housing, other locations are possible for the signal light of the invention, including the top and outboard rim of the exterior housing, and even elsewhere on the exterior vehicle body as appropriate.

Figure 27:
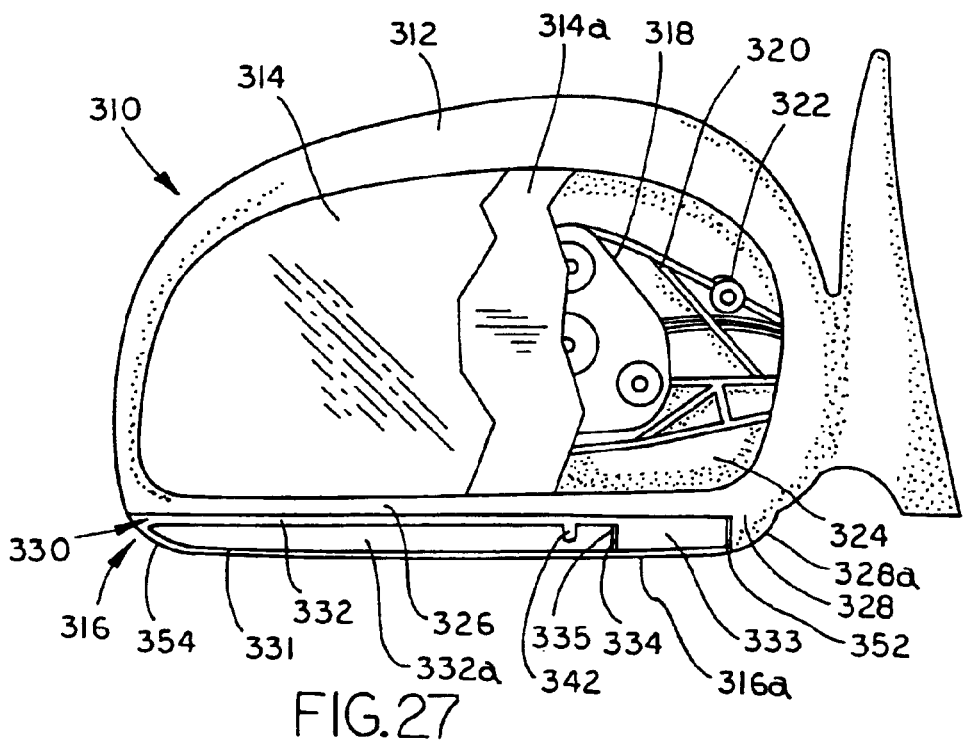
FIG. 27 is an elevation view of a second embodiment of the exterior rearview mirror assembly of the present invention.
Figure 28:
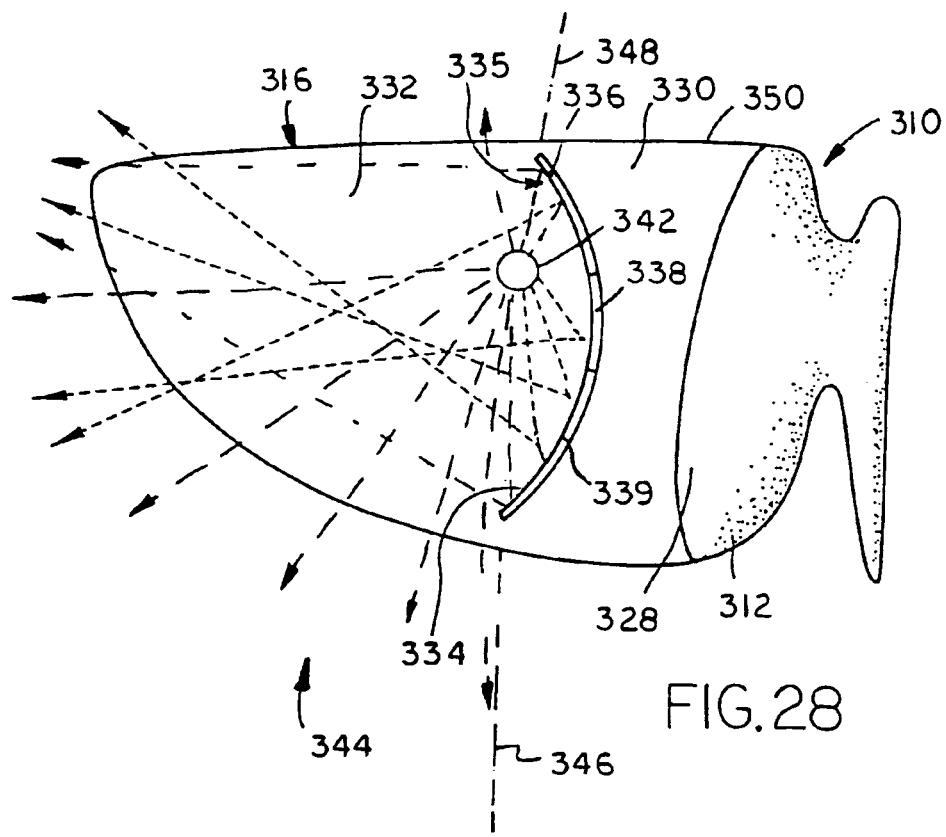
FIG. 28 is a bottom plan view of the exterior rearview mirror assembly of FIG. 27.
Figure 29:
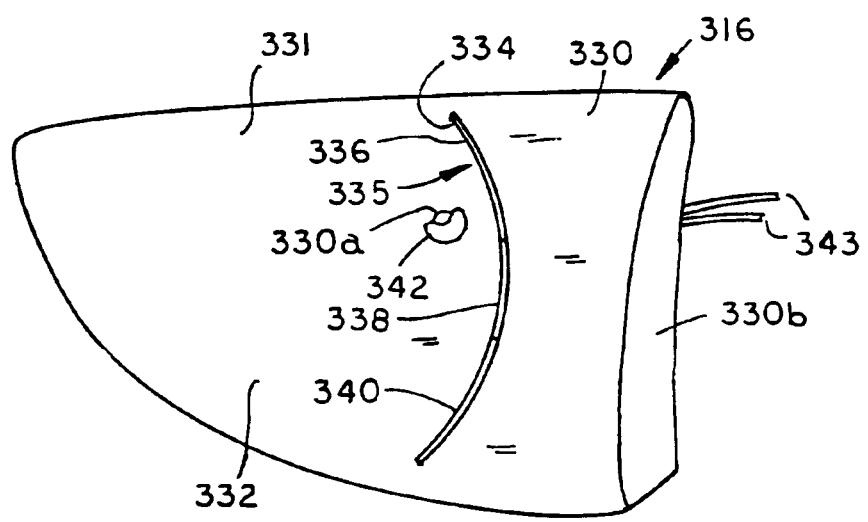
FIG. 29 is a plan view of a light module of the exterior rearview mirror assembly of FIG. 28.

Referring to FIGS. 27–29, a second embodiment 310 of the exterior rearview mirror assembly of the present invention is illustrated. Exterior rearview mirror assembly 310 includes a housing or casing 312 in which a reflective element 314 is supported. In addition, exterior rearview mirror assembly 310 includes a signal light and, preferably, a signal light 316 which provides a light pattern similar to light pattern 217 described in reference to the first embodiment and is supported by casing 312 which will be further described below.

Reflective element 314 is mounted to a backing plate 314a, which is supported on a positioning device or actuator 318, which in turn is mounted to a mounting bracket 320. In the illustrated embodiment, mounting bracket 320 is supported by mounting bosses 322 provided on casing wall 324 of casing 312. It should be understood, that reflective element 314, therefore, can move independently of the signal light 316, which is preferably mounted in a fixed position relative to casing 312. However, other mounting arrangement may be used for reflective element 314 and for the exterior rearview assembly, including a fixed position exterior rearview mirror assembly or a mounting arrangement in which mounting bracket is rotatably coupled to a vehicle mounting bracket to provide a break-away function of the exterior rearview mirror assembly. In a break-away exterior mirror assembly, signal light 316 is preferably mounted to move with the casing and, therefore, remains fixed relative to the casing.

As best seen in FIG. 27, signal light 316 is mounted to a bottom wall portion 326 of casing wall 324. Bottom wall portion 326 of casing wall 324 includes a stop or an abutment 328 against which signal light 316 abuts when mounted to casing 312. Signal light 316 is preferably mounted to casing 312 by for example fasteners, such as threaded fasteners, keys, or projecting pins with enlarged heads which provide a snap-fit coupling between signal light 316 and bottom wall 326. Alternately, signal light 316 may include tracks or guides and with casing 312 including a corresponding guide or track so that signal light 316 can be inserted between the respective guides, or tracks. Furthermore, signal light 316 includes a lower most surface 316a which preferably aligns and, more preferably, is flush with the lower most surface 328a of stop 328 so that when installed, signal light 316 follows the aerodynamic contours of casing 312 to provide an aerodynamically contoured exterior rearview mirror assembly 310.

Referring to FIGS. 28 and 29, signal light 316 includes a housing 330 which includes a cover 331 and a base 332. Base 332 includes a mounting portion and a raised or projecting portion 333 which defines a mounting surface 334. Housing 330 is preferably plastic, such as nylon, a melt processible plastic, including for example polycarbonate, acrylic, or the like and, additionally, matches the color of casing 312. Cover 331, which is preferably a clear plastic cover, extends over base 332 and is secured thereto using conventional means, including for example releasable couplers, including threaded fasteners, snap-fit couplers or the like, or by welding, such as sonic welding, heat staking or the like, or by an adhesive. Cover 331 defines a cavity or space 332a between base 332 and cover 331. Base 332 supports a light source 342, which is housed in cavity 332a, and a light reflecting member 335 which is preferably mounted to mounting surface 334 for reflecting light from light source 342 outwardly from signal light 316. Light reflecting member 335 preferably comprises a multi-faceted reflector having a compound shape and includes a plurality of reflector elements 336, 338, and 340. Each reflector elements 336, 338, and 340 may comprise a metal reflector, such as a stamped aluminum reflector, a polished metal reflector, a painted/coated printed surface with a high specular and/or diffused paint, film, tape, coating, or the like, a vacuum metalized substrate, such as vacuum metalized glass or plastic, a metalized or reflective mineral filled substrate, such as a mineral filled plastic substrate, a reflective metal filled substrate, such as a metal filled plastic, or the like. Each of the respective reflective elements 336, 338, and 340 may have a concave, a convex, or planar surface, or a multiradius surface such as an anamorphic asphere shape.

Preferably light source 342 is positioned adjacent reflector element 336 and sufficiently spaced from reflector element 336 such that the light emitted from light source 342 reflects off reflector elements 336, 338, and 440 to provide a pattern as shown in FIG. 28. Light source 342 may comprise a bulb, a diode, or the like, and is powered through wiring 343 which extends from signal light 316 to casing 312, for example by way of an opening 330a provided in base portion 332 of housing 330. Optionally, light source 342 may comprise a light pipe (not shown) which delivers or directs light from a remote light source in the vehicle in a similar manner as described in reference to the previous embodiment.

As described above, cover 331 may be integrally molded with base portion 332. In this manner, light source 342 may be inserted into cavity 332a through opening 330a of base 332. Furthermore, cavity 332a may be reduced such that cavity 332a comprises a light source receiving socket. In addition, signal light 316 may include a light conduiting member, such as described in reference to signal light 216 or signal light 416, positioned in cavity or space 332a to further enhance the direction of light emitted from light source 342.

Referring to FIG. 28, signal light 316 emits light in a light pattern 344, which is defined between leading edges 346 and 348. When mounted to casing 312, light pattern 344 directs light forwardly and rearwardly of the vehicle and to the side of the vehicle but away from the cabin of the vehicle so as to avoid contact with the driver's eyes similar to light pattern 217 in FIG. 21.

As best seen in FIG. 27, cover or lens 331 extends over housing 330 from a first end or approximate end 352 to a second or distal end 354. For further details of light source 342, reference is made to the description of light sources 232 and 258 as described in reference to the first embodiment. Preferably, cover 331 includes a neutral spectra content and comprises a plastic lens, such as a polycarbonate lens. Furthermore, cover 331 may be a prescription lens such as, a fresnel lens, including a micro fresnel lens, a diffusive optic lens, a diffractive optic lens, a refractive optic lens, a reflective optic lens, a holographic optic lens, a binary optic lens, a clear optic lens, a prismatic lens, a pillow lens, and a sinusoidal optic lens, or the like. In which case, the color of the light from signal light 316 may be introduced by light source 342, a boot or cover over light source 342, a filter, or reflector 335. Similar to as described in reference to light sources 232 and 258, signal light 316 may emit an amber, yellow-amber, or red-amber light. Furthermore, cover 331 may optionally blend with the color of casing 312, with signal light 316 still emitting an amber, amber-yellow or red-amber light. Alternately, the color of the light may be generated by cover 331 or a combination of any one or more of the aforementioned devices.

Preferably, signal light 316 produces a light intensity in the range of about 0.3 to about 200 candela, more preferably, in a range of about 0.6 to about 150 candela, and most preferably, in a range of about 1.0 to about 100 candela, such that signal light 316 preferably meets the applicable specifications for the automobile industry, as described in the previous embodiment. In this manner, signal light 316 is visible to persons on the road who are oncoming or approaching the vehicle from the rearward direction. Furthermore, signal light 316 preferably extends to the outer most portion and wraps around the bottom wall 326 of casing 312 so that light emitted from signal light 316 is visible from the side of the vehicle, and vehicles which are in the vehicle's blind spot can clearly see the signal light when actuated.

Preferably, signal light 316 is a unitary module or modular turn signal which can be easily serviced and/or replaced in its entirety. Furthermore, signal light 316 is preferably at least substantially water impervious and optionally may include a socket or electrical connection to the vehicle electrical wiring system. In addition, as described in reference to the previous embodiment, signal light 316 may incorporate a circuit board for flexible circuitry, which couples to the electrical system of the vehicle for powering light source 342.

Figure 30:
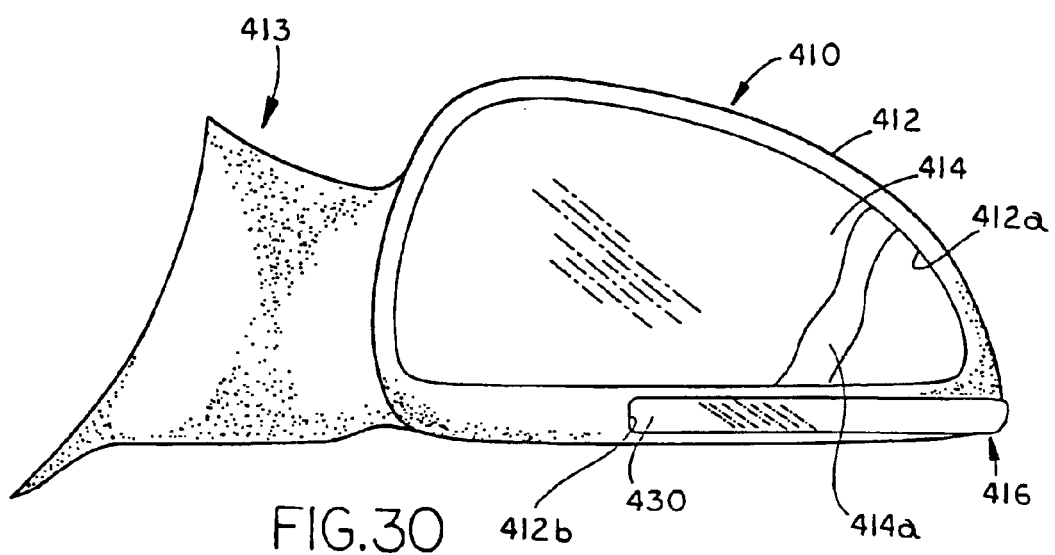
FIG. 30 is a perspective view of a third embodiment of the exterior rearview mirror assembly of the present invention.

Referring to FIGS. 30–31, the numeral 410 designates a third embodiment of the exterior rearview assembly of the present invention. Exterior rearview assembly 410 includes a mirror casing or housing 412, which includes a sail 413 which is adapted to mount on a vehicle, a reflective element 414 which is supported in housing 412, and a signal light 416 which is also supported in housing 412. Signal light 416 is adapted to direct light forwardly and rearwardly of the vehicle so that vehicles approaching from the opposite direction of the vehicle and rearwardly of the vehicle may observe signal light 416. Additionally, signal light 416 is adapted to project light laterally with respect to the vehicle to provide a side light and so function as a side marker. Similar to exterior mirror assembly 210, signal light 416 is preferably adapted to direct the signal light in a light pattern 417 such that the light does not extend into the cabin of the vehicle to distract the driver of the vehicle. Furthermore, by projecting light rearwardly, forwardly and laterally from the side of the vehicle, approaching vehicles, whether from the forward direction of the vehicle or from the rearward direction of the vehicle or vehicles that are entering the blind spot of the vehicle, can observe the signal light and have advanced notice if the driver of the vehicle intends to make a lane change or turn.

Rearview mirror assembly 410 may comprise a fixed position exterior rearview mirror assembly or may comprise a break-away rearview mirror assembly, which moves between normal operating position in which the rearview mirror assembly is extended from the vehicle to a folded position against the body of the vehicle and the exterior rearview mirror assembly 410 is impacted with sufficient force. Examples of break-away rearview mirror assemblies are well known and reference is made to the first embodiment of the exterior rearview mirror assembly for at least one example such a break-away assembly.

Housing 412 is generally cup-shaped and includes a rearwardly facing opening 412a in which reflective element 414 is supported. Reference is made to exterior rearview mirror assembly 210 for examples of preferred material for housing 412. As described above, reflective element 414 is supported in housing 412. Preferably, reflective element 414 is mounted on a backing plate 414a, which in turn is supported by a positioning device, for example an electrical actuator or the like. Again, reference is made to the exterior rearview mirror assembly 210 for an example of how reflective element 414 is supported in housing 412. Furthermore, reference is made to exterior rearview mirror assembly 210 for examples of preferred reflective elements and for examples of other components which may be mounted or housed in exterior rearview mirror assembly 410.

As best seen in FIGS. 30 and 31, signal light 416 is preferably positioned in a lower portion or bottom rim of casing 412 and includes a light conduiting member or light pipe 430 and a plurality of light sources 432. As described in reference to the previous embodiments, the light emitted from the signal light 416 is preferably yellow, amber, yellow-amber, or amber-red depending on its application. Again, reference is made to the earlier embodiments for examples of how the color is generated. Light pipe 430 is preferably formed, such as by molding, from a plastic material, such as polycarbonate or acrylic or the like, and is, therefore, substantially rigid. As best seen in FIG. 31, light pipe 430 includes a plurality of light transmitting or conduiting portions 430a, which are spaced and arranged in a generally radial fashion. Each light transmitting or conduiting portion 430a includes a leading edge 434, which defines a light input surface. Furthermore, each light transmitting or conduiting portion 430a includes a distal surface or outboard edge 436 which defines a light emitting surface which is preferably arranged or formed, to follow the contour of exterior mirror housing 412. In addition, each light transmitting or conduiting portion 430a includes side walls 438 and 440, which extend from light input surface 434 outwardly toward light emitting surface 436 which define radially extending grooves or channels in light conduiting member 430. As best seen in FIG. 31, side walls 438 and 440 preferably terminate before reaching light emitting surface 436. Alternately, one or more light conduiting portions may include respective side walls 438 and 440 that extend from their respective light input surfaces 434 to their respective light emitting surfaces 436. In this manner, light pipe 430 comprises a plurality of discrete light transmitting or conduiting portions rather than a unitary light conduiting or transmitting member.

Light sources 432 are positioned and, preferably, optically coupled to light input surfaces 434 of each respective light transmitting or conduiting portion 430a. Referring to FIGS. 31A and 31B, in the illustrated embodiment, light sources 432 comprise surface light emitting diodes (LED's) and preferably comprise a flat rectangular wafer 432a with a projecting emitter 432b, which are commercially available from the Piranha line of Hewlett Packard. In preferred form, each light input surface 434 includes a recess and, more preferably, a cylindrical groove 434a for receiving the respective light emitting portion 432b of the light source 432. In this manner, the light emitters 432b of the respective LED's may achieve good optical coupling with light input surfaces 434. Alternatively, each of the respective light input surfaces 434 of light transmitting conduiting portions 430a may include a semi-spherical recess for receiving the respective light emitters of the light sources 432, which will maximize the optical coupling between light sources 432 and light conduiting portions. However, semi-spherical recesses are harder to tool and to assembly.

Light input surfaces 434 of each light transmitting or conduiting portion 430a are generally parallel or only slightly angled with respect to its respective light emitting surface 436 such that the light emitted from the respective light source 432 will project outwardly from light emitting surface with minimal reflection inwardly from the light emitting surface. Furthermore, sides 438 and 440 are angled with respect to light input surface 434 such that light from light source 432 is internally reflected and redirected outwardly from light emitting surface 436. In so doing, light pipe 430 optimizes the internal reflection of each light transmitting or conduiting portion 430*a* to efficiently direct the light emitted from light source 432, which tends to project light in a cone shape light pattern, outwardly through light emitting surface 436.

Signal light 416 preferably comprises a module which is preferably removably inserted into a slotted opening or recess 412*b* formed in housing 412 of exterior rearview mirror assembly 410. Preferably, signal light 416 includes a lower housing portion 442 and an upper housing portion or cover 444. Upper housing portion 444 may be secured to lower housing portion 442 by conventional fasteners, for example fasteners, including screws, snap-fit couplers, or the like, such that light sources 432 are serviceable, or may be welded or adhered to housing 442, for example by sonic welding, heat staking, or an adhesive, so that signal light 416 can be replaced as a unit. Light conduiting member 430 is positioned in lower housing portion 442 and is preferably integrally molded with housing portion 442 such that light emitting surface or surfaces 436 of light pipe 430 form a portion of the outer perimeter wall 446. However, it should be understood that light conduiting member 430 may be separately formed from housing portion 442 and, instead, inserted into housing and positioned such that light emitting surface or surfaces 436 is optically coupled to perimeter wall 446.

In preferred form, lower housing portion 442 is formed or molded from a clear plastic, including for example polycarbonate, acrylic, or the like. In contrast, upper housing portion 444 may comprise any suitable plastic, for example a melt-processible plastic or moldable material, such as described in reference to casing 212. Furthermore, upper housing portion 444 may be opaque.

Each of the respective light sources 432 includes electrical wiring 447, which extends through housing 442 and through an opening 448 provided in perimeter wall 446 of housing 442. Optionally, perimeter wall 448 may include an electrical outlet or plug to which the electrical wiring is coupled for coupling to the electrical system of the vehicle. In addition, light sources 432 may be coupled to and powered by a circuit board mounted in housing 442, which is electrically coupled to the electrical system of the vehicle. Furthermore, light sources 432 may be powered by flexible circuitry, which is electrically coupled to the electrical system of the vehicle, or any other suitable conventional power supply system. Alternately, each individual wire may project from housing 442 for individually coupling to the electrical system of the vehicle.

As best seen in FIG. 31, upper housing portion 444 includes one or more retaining clips 450 for securing to a corresponding structure provided in housing 412. In the illustrated embodiment, retaining members 450 comprises conventional bayonet or snap type couplers, but it should be understood that other couplers, such as threaded fasteners, or the like, may be used. As described in preferred form, light conduiting or transmitting portions 430*a* rely on internal reflections of the light emitted from light sources 432 to transmit or conduit the light from light source to light emitting surfaces 436. In this manner, light conduiting member 430 is easy to manufacture and assembly and relies on the geometry of the light input surfaces and side walls in order to produce an effective signal light 416 rather than reflections from reflective surfaces. However, it should be understood, that side walls 438 and 440 may include reflective surfaces, such as vacuum metalized surfaces or the like. However, this would entail additional manufacturing steps and require more careful handling of the article and, consequently, would increase the cost of the signal light 416.

Figure 32A:
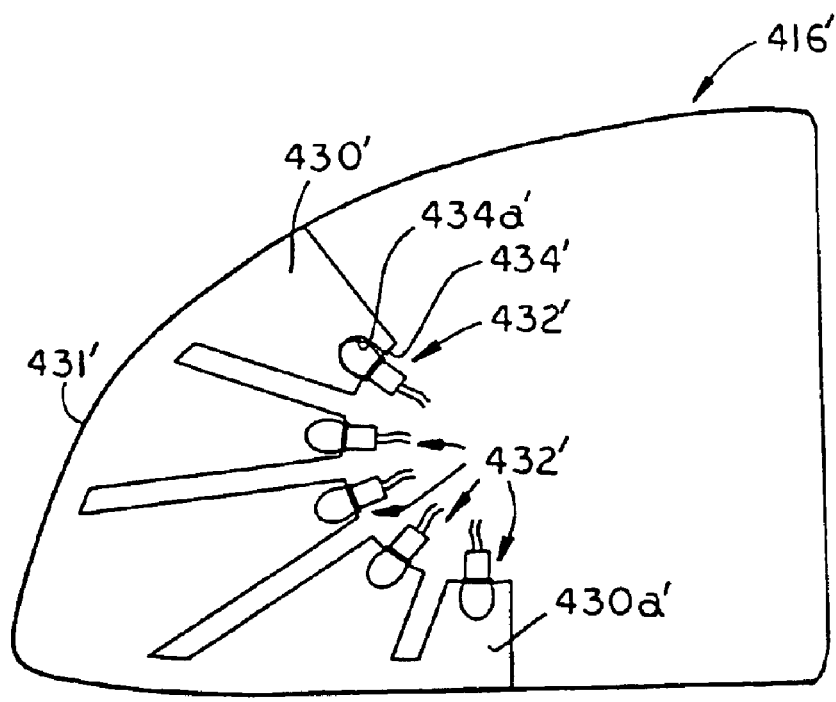
FIG. 32A is a plan view of a second embodiment of the signal light of FIG. 31.

Referring to FIG. 32A, signal light 416' may include bulb shaped light sources 432'. In a similar manner to signal light 416, light input surfaces 434' of light conduiting members 430' may include recessed portions 434*a'* for receiving the respective bulb shaped light emitters 432'.

Figure 32B:
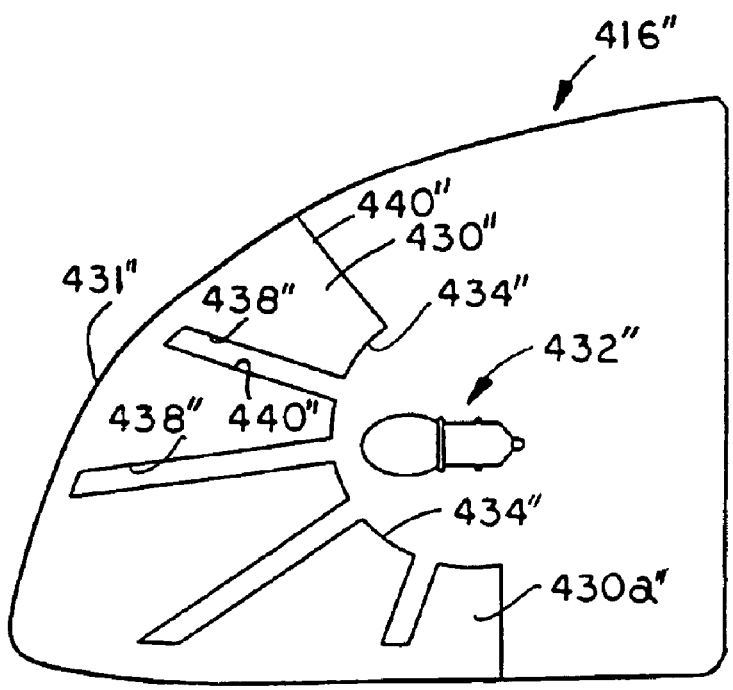
FIG. 32B is a plan view of a third embodiment of the signal light of FIG. 31.

As best seen in FIG. 32B, a third embodiment 416" of signal light includes a single light source 432" such as a conventional light bulb to emit light for input into the respective light input surfaces 434" of each respective light conduiting portion 430*a"* of light pipe 430".

It should be understood from the foregoing, that light pipes 430, 430', and 430" are formed with respective side walls 438 and 440, 438' and 440', and 438" and 440" to guide the light from the respective light source or light sources 432, 432', 432", to the outboard edge 431, 431', 431" of light pipe 430 to form a signal light which directs light rearwardly, laterally, and forwardly of the vehicle. Whether light pipes 430, 430', 430" are formed as a single unit with a plurality of light transmitting or conduiting portions 430*a*, 430*a'*, 430*a"*, or as a collection of discrete light transmitting or conduiting portions, in which case discrete regions of light will be produced, signal lights 416, 416', and 416" provide simple and inexpensive light assemblies which are easy to manufacture and install.

It should be understood that should it be desired to vary the intensity of the signal lights so they are brightest during high ambient lighting conditions, such as on a sunny day, but so that they are dimmer when ambient conditions are lower, such as at night, the intensity of the signal lights can be modulated using a photosensor such as a photoresistor, photodiode, phototransistor, or their like. A photosensor that controls the intensity of the signal light so that it reduces its intensity during low ambient light driving conditions, such as by pulse width modulation on the electrical line powering the LEDs in the signal light, may be mounted integrally with the signal light module itself, or it may be part of the vehicle electronics itself, such as a photosensor mounted as a part of an automatic electrochromic mirror circuit, as part of a vehicle automatic headlamp activation circuit, as part of a headlamp daylight running light control circuit, or their like.

Referring to FIGS. 33–37, the numeral 510 designates a fourth embodiment of the exterior rearview assembly of the present invention. Exterior rearview assembly 510 comprises a powerfold exterior rearview mirror assembly and includes a housing or casing 512 in which a reflective element 514 is supported. Reflective element 514 is optionally supported in casing 512 in a similar manner to that described in reference to the earlier embodiment and, therefore, reference is made therein for further mounting details and, additionally, for examples of reflective elements which can be employed. In preferred form, exterior rearview assembly 510 includes a "powerfold" mechanism that is typically operated and actuatable/deactuatable from within the vehicle cabin either by a user operator switch or by a speed sensor that folds the mirror out when a predetermined vehicle velocity is sensed and that upon activation by the driver causes a folding portion 510*a* of exterior mirror assembly 510, for example casing 512, to fold or move or pivot about a fold-away axis 511 on a non-folding portion 510*b* of exterior mirror assembly 510, for example a mounting bracket or the like, from its normally extended viewing position wherein mirror assembly 510 provides a field of view to a compact folded position wherein the rearwardly facing side of the folding portion is disposed generally parallel to the vehicle body (FIGS. 34 and 35). "Powerfold" exterior rearview mirrors are conventional and, therefore, the specific details of the "powerfold" mechanisms are omitted herein. In many European countries, "powerfold" exterior rearview mirror assemblies are used during parking to reduce the width of the vehicle.

Figure 36:
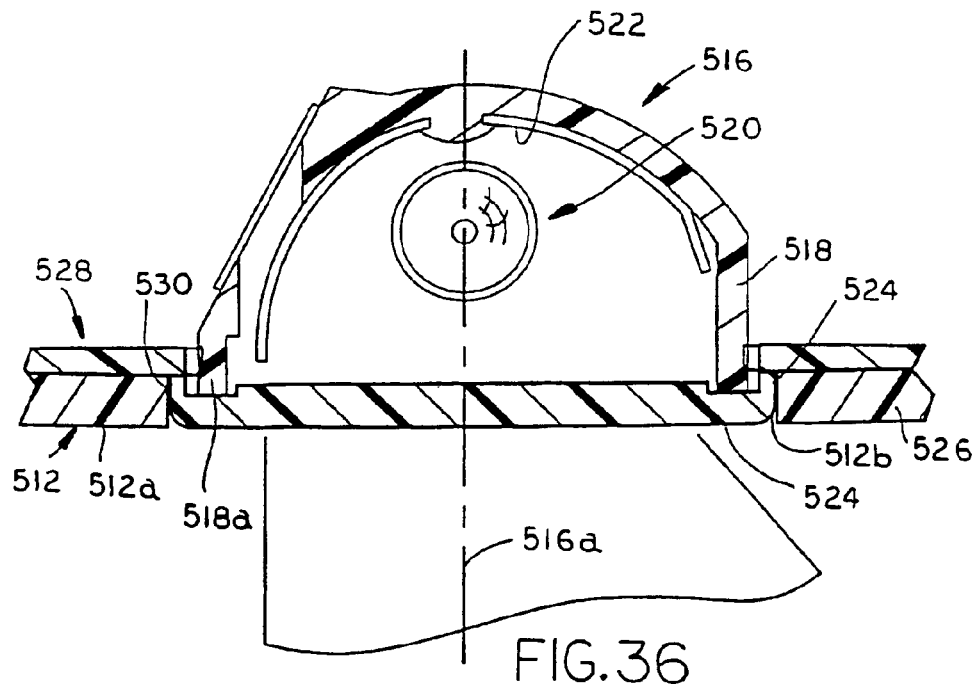
FIG. 36 is a cross-sectional view taken along line XXXVI—XXXVI of FIG. 34 illustrating a light module of the exterior rearview mirror assembly of FIG. 33 and a positioning mechanism for the light module.

In addition, exterior rearview mirror assembly 510 includes a security light and, preferably, a self-contained, unitary security light module 516 which in the illustrated embodiment is mounted to folding portion 510a of mirror assembly 510 on a bottom wall portion 526 of casing wall 512a (FIG. 36). Security light 516 is preferably of similar construction to unitary light module 200 described in pending application entitled EXTERIOR VEHICLE SECURITY LIGHT, Ser. No. 08/687,628 filed on Jul. 26, 1996, by Todd W. Pastrick et al., now U.S. Pat. No. 5,823,651, which is assigned to Donnelly Corporation of Holland, Mich. and which is incorporated herein in its entirety. Security light 516 includes a housing 518, in which a light source 520 and reflector 522 are supported, and a cover or lens 524. Housing 518 is preferably a plastic material, such as polycarbonate, polyester, nylon, acetal, polypropylene or ABS. Cover 524 is optionally welded to housing 518, for example by sonic welding, heat staking or the like, or adhesively attached by an adhesive. Reflector 520 may comprise, for example a polished metal substrate, a vacuum metalized substrate, or a metal filled substrate. As best seen in FIG. 33–37, reflector 520 and lens 524 are adapted to direct light in a light pattern 517. For further details of the components of security light 516, reference is made to the above incorporated pending patent application. As described in the referenced application, security light 516 is adapted to direct light generally rearwardly of the vehicle and to fan out laterally from the vehicle to provide a lighted security zone near or adjacent the vehicle. Furthermore, security light 516 is preferably mounted in or substantially incorporated to casing 512 with minimal protrusion from casing 512 into the slipstream such that security light 516 does not add to the aerodynamic drag of mirror assembly 510 and, most preferably, with lens 524 substantially flush with the outer surface of casing 512. Moreover, in preferred form, at least security light 516 or light source 520 is serviceable.

As best seen in FIGS. 34 and 35, security light 516 may be optionally rotationally mounted in casing 512 such that when folding portion 510a of exterior rearview mirror assembly 510 is moved to its compact folded position, security light 516 remains in the same orientation with respect to the vehicle such that the light pattern 517 which is projected from security light 516 remains substantially unchanged despite the repositioning of exterior rearview mirror assembly 510. In other words, security light 516 remains stationary with respect to vehicle V but rotates in casing 512 when exterior mirror assembly 510 moves to its folded position.

Referring to FIG. 36, security light 516 is mounted in an opening 512b in casing wall 512a. Security light 516 is mounted in opening 512b by a rotatable sleeve or bushing 530 so that security light 516 is rotatable about its axis 516a. In this manner, security light 512 is movably or rotatably mounted in casing 512. Preferably, exterior mirror assembly 510 includes an actuator or driver 528 such as a gear or other suitable mechanism, including a servo-motor driver, a belt, a cylinder, including a hydraulic or pneumatic cylinder, or the like, which repositions or rotates security light 516 about axis 516a to maintain light pattern 517 in a generally fixed position with respect to the vehicle. As best seen in FIG. 36, gear 528 may engage threads 518a formed on a lower portion of or a threaded collar mounted to housing 518.

Furthermore, exterior rearview mirror assembly 510 may also include a break-away mounting which permits the exterior mirror assembly to fold to a break-away position upon impact. Both of the powerfold and break-away features are commonly known in the mirror art.

Alternately, security light 516 may be mounted in folding portion 510a in a fixed position; in which case, when folding portion 510a moves to its folded position, security light 516 remains stationary with respect to folding portion 510a but moves with respect to the vehicle. In this embodiment, therefore, security light 516 is preferably oriented such that it projects light to provide a security zone when folding portion 510a is in its folded position, and preferably one that washes the side of the vehicle and that provides adequate ground illumination (an average of at least one lux ground illumination intensity desired, at least five lux preferred) at the front and rear entrances/exits of the vehicle where occupants may enter/exit the cabin. Typically, when a driver of a vehicle with a powerfold exterior mirror approaches the vehicle, the powerfold exterior mirror assembly is in its folded position and does not move to its extended position until the driver is already in the car with the ignition on. However, where the driver of the vehicle uses a remote control for actuating the powerfold exterior mirror assembly as the driver approaches the vehicle, the first embodiment of the powerfold exterior mirror assembly may be preferred so that if the folding portion of the mirror assembly is in its extended before the driver enters the vehicle, then the security light will provide a lighted security zone adjacent the vehicle which washes the side of vehicle and provides ground illumination at the cabin entrances regardless of the position of the folded portion of the mirror assembly.

Optionally, the exterior rearview mirror assembly may include a proximity sensor 540 mounted on casing 512 which is electrically coupled to the powerfold control system (not shown). Proximity sensor 540 actuates the powerfold function upon detection of an object, such as another vehicle or wall, or the like. Furthermore, proximity detector 540 may be coupled with the light module control circuitry (not shown) so that when the powerfold function is actuated by the detection of an object, security light 516 will be similarly actuated to rotate with respect to casing 512 to maintain light pattern 517 for the security zone in substantially the same orientation.

Referring to FIG. 37, a fifth embodiment 610 of the exterior rearview mirror assembly is illustrated. Exterior rearview mirror assembly 610 is of similar construction to exterior rearview mirror assembly 510 and also comprises a powerfold mirror assembly. Assembly 610 includes a folding portion 610a, which houses a reflective element 614, and non-folding portion 610b, which is adapted to fixedly mount to the vehicle body. Powerfold mirror assembly 610 is typically operated and actuatable/deactuatable from within the vehicle cabin either by a user operator switch or by a speed sensor as described in reference to the previous embodiment. In preferred form, upon activation by the driver (or by the speed sensor), folding portion 610a pivots or folds about a fold-away axis 611 on non-folding portion 610b from its normal extended, viewing position to a folded position wherein the rearwardly facing side of exterior mirror assembly 610 is disposed generally parallel to the side of the vehicle.

In this embodiment, a security light 616 is mounted in non-folding portion 610b of assembly 610. Security light 616 is of similar construction to security light 516 and, therefore, reference is made to the previous embodiment for further details thereof. In this manner, when folding portion 610a is moved between its extended position and its folded position, security light 616 will provide a lighted security zone adjacent the vehicle which washes the side of vehicle and provides ground illumination at the cabin entrances regardless of the position of the folded portion of the mirror assembly. Therefore, pattern of light 617 projected by light module 616 remains generally stationary with respect to the vehicle and is unaffected by the repositioning of folding portion 610a of assembly 610.

Furthermore, as described in reference to the previous embodiments, reflective element 614 may comprise an adjustable reflective element; for example, assembly 610 may include a manual actuator or an electrical actuator or the like, as should be understood by those skilled in the art. Moreover, movement of reflective element 614 is independent of the security light 616 as security light 616 is mounted or supported independently of reflective element 614 to assembly 610.

As best seen in FIG. 38, security light 616 is preferably substantially incorporated at non-folding portion 610b and aerodynamically located into fixed portion 610b. Preferably, security light 616 is incorporated into exterior mirror assembly 610 with minimum protrusion into the slipstream of the mirror assembly. In this manner, security light 616 does not significantly impact and, preferably, does not add to the aerodynamic drag of exterior mirror assembly 610. Most preferably, security light 616 is located into fixed portion 610b with its security light lens 624 substantially flush with the outer surface 620 of folding portion 610b. Furthermore, in preferred form at least security light 616, or its light source 620, is serviceable.

With regard to embodiments of this present invention that utilize a security light module incorporated in a powerfold exterior mirror assembly where the security light is located in the folding portion of the powerfold assembly, the optical design of the light module can be such that a pattern of ground illumination is provided, such as is illustrated in FIGS. 11 and 12, and where the side of the vehicle and the entrances/exits of the cabin are well illuminated, when the folding portion of the powerfold assembly is retracted and folded to the side of the vehicle body. Alternately, the preferred patterns of FIGS. 11 and 12 can be realized when the folding portion is extended to its outward, non-retracted position. In this regard, it is optionally desirable that the folding portion, if retracted and folded to the vehicle body when the driver approaches the vehicle from a distance, can be remotely unfolded such as by providing a button on a hand held transmitter (such as a keyfob, commonly provided to vehicle owners today for remote lock/unlock of vehicle doors) which, when actuated, transmits a signal, preferably a radio frequency (RF) signal or an infrared (IR) signal, to a receiver in the vehicle of which, upon receipt of the remote command, causes the powerfold assembly to unfold and move its folding portion to the fully extended, normal driving, unfolded position. Simultaneously, the security light can be activated so that when the powerfold unit unfolds, the signal light therein illuminates, and with both features being actuated by remote actuation from a distance. Such feature or features can be locked out, as described previously, to avoid inadvertent operation when the vehicle is in motion.

Referring to FIGS. 39–41B a sixth embodiment of an exterior rearview mirror assembly 710 is illustrated. Exterior rearview mirror assembly 710 is a foldable exterior rearview mirror assembly and includes a base or sail 712, for mounting to a vehicle, and a housing 714 which is pivotally mounted to the base 712 in a conventional manner and preferably with a break-away mounting. Optionally, exterior rearview mirror assembly 710 may include a powerfold mechanism 715 (FIG. 39). In this manner, housing 714 moves from a normal use position to a folded position towards the vehicle, for example when housing 714 is impacted by a force sufficient to actuate the break-away mounting or when the powerfold mechanism is actuated. It should be understood, that the term folded position encompasses any position in which housing 14 is folded from its normal use position towards the vehicle, including a folded position in which housing 714 is folded against the vehicle shown in FIG. 40. Exterior rearview mirror assembly 710 also includes a reflective element 716 which is supported in housing 714. Reference is made to the previous embodiments for examples of reflective element 716, break-away mountings, or powerfold mechanisms, and for examples of preferred materials for housing 714.

As best seen in FIGS. 41A and 41B, exterior rearview mirror assembly 710 includes a ground illuminating light assembly 718, which is incorporated into housing 714, as will be more fully described below. Light assembly 718 directs light downwardly and rearwardly of the vehicle to provide a security light in a light pattern 719 shown in FIG. 39. Light pattern 719 is defined between leading edges 720 and 722, with leading edge 720 extending rearwardly and generally parallel to the side of the vehicle and leading edge 722 angled away from the vehicle and optionally substantially orthogonal to the side of the vehicle such that the area of ground that is illuminated by light assembly 718 is adjacent both the driver and passenger doors of the vehicle. Thus, light pattern 719 is projecting generally rearwardly and generally parallel to the vehicle centerline or longitudinal axis 719a (FIG. 39). In the illustrated embodiment, both passenger and driver side exterior rearview mirror assemblies 710 and 710' incorporate light assembly 718, with driver side assembly 710' providing a mirror image light pattern 719' to light pattern 719. However, it should be understood that light assembly 718 may be incorporated into one or both of the driver and passenger side exterior rearview mirror assemblies.

As best seen in FIG. 40, when exterior rearview mirror assembly 710 is moved from its normal operating position (shown in FIGS. 39 and 41A) toward the vehicle to a folded position (shown in FIGS. 40 and 41B), light assembly 718 directs light in a light pattern 723 downwardly and rearwardly of the vehicle as defined between leading edges 724 and 726, with leading edge 724 being angled toward the vehicle side and leading edge 726 being angled away from the vehicle. While light pattern 723 produced by light assembly 718 in the folded position is illustrated as a reduced lighted security zone, as compared to the light pattern when the exterior mirror assembly is in its normal use position, it should be understood that the security zone of illumination may be increased or decreased as desired by adjusting the optics of the light assembly 718, as will be appreciated from the description which follows.

Referring again to FIGS. 41A and 41B, light assembly 718 preferably includes two light sources 728 and 730 and at least one optical element 732. Alternately, a single light source with bifurcated and/or compound emitting directions can be used and/or an optical element such as a lens with bifurcated and/or compound facets can be used. Optical element 732 includes a first illuminator portion 734 which extends along the lower wall 736 of housing 714 and which directs light downwardly and rearwardly of the vehicle when the housing 714 is in its normal operating position preferably while restricting light from entering the vehicle so that the light is substantially unobservable by the occupant of the vehicle. Optical element 732 includes a second illuminator portion 740 which extends from first illuminator portion 734 and wraps around the lower outboard corner of housing 714 and upwardly along end or outboard wall 742 of housing 714. Second illuminator portion 740 of optical element 732 projects light downwardly and rearwardly off the vehicle when housing 714 is in a folded position, as shown in FIG. 40. Preferably, light source 728 is associated with and projects light through first illuminator portion 734 of optical element 732, while light source 730 is associated with and projects light though second illuminator portion 740 of optical element 732. In this manner, light sources 728 and 730 may be individually actuated when the mirror assembly housing 714 is moved between the normal operating position and folded positions. Light sources 728 and 730 preferably comprise light emitting diodes (LED's) or mini or micro-incandescent lamps, for example micro bulbs such as Christmas light bulbs. For examples of other light sources which may be incorporated into light assembly 718, reference is made to the previous embodiments.

In preferred form, optical element 732 comprises a light conduiting member, for example a light pipe of the type described in the previous embodiments. In this manner, light sources 728 and 730 may be positioned adjacent to or optically coupled to respective input ends 734a and 740a of the first and second illuminator portions 734 and 740 of light pipe 732. As described in reference to the previous embodiments, light pipe 732 preferably includes a plurality of internal light reflecting surfaces, which direct light through light pipe 732 from input ends 734 and 740a and outwardly from light pipe 732 through light emitting surfaces 734b and 740b.

In one form, optical element 732 may comprise two or more light pipe portions, which are preferably aligned and arranged in an abutting relationship to form a substantially continuous illuminator forming two or more discrete illuminator portions. Further, optical element 732 preferably comprises an L-shaped light pipe or L-shaped composite light pipe.

Optionally, light assembly 718 may be formed as part of a light module 750, which module preferably defines a lower portion 714a of housing 714 of exterior rearview mirror assembly 710. Similar to the previous embodiment, module 750 preferably includes a housing which is adapted to releasably secure to housing 714 of mirror assembly 710. In this manner, module 750 may be quickly and easily removed for service or replacement. Furthermore, the module may incorporate a plurality of other devices in addition to light assembly 718, as will be described more fully below.

Figure 42A:
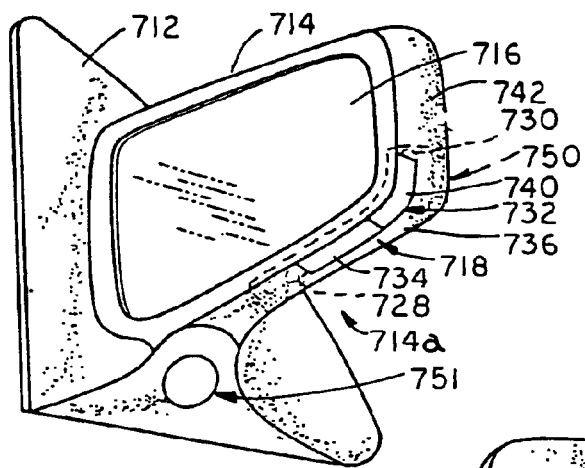
FIG. 42A is a perspective view of a seventh embodiment of foldable exterior mirror assembly similar to FIG. 41A incorporating a ground illuminating or security light.
Figure 42B:
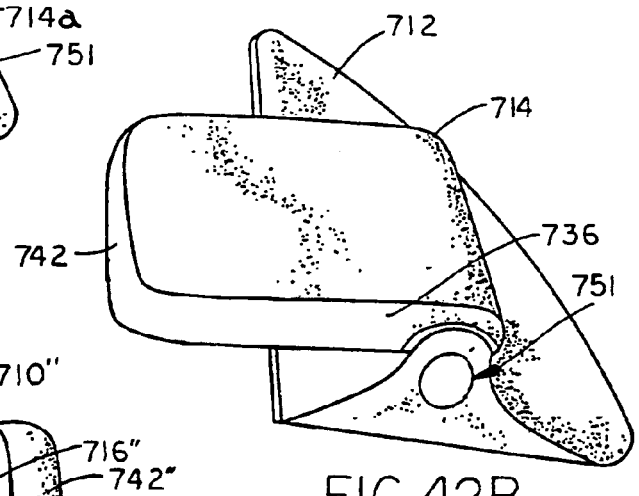
FIG. 42B is a perspective view of an eighth embodiment of a foldable exterior rearview mirror assembly incorporating a ground illuminating light.
Figure 42C:
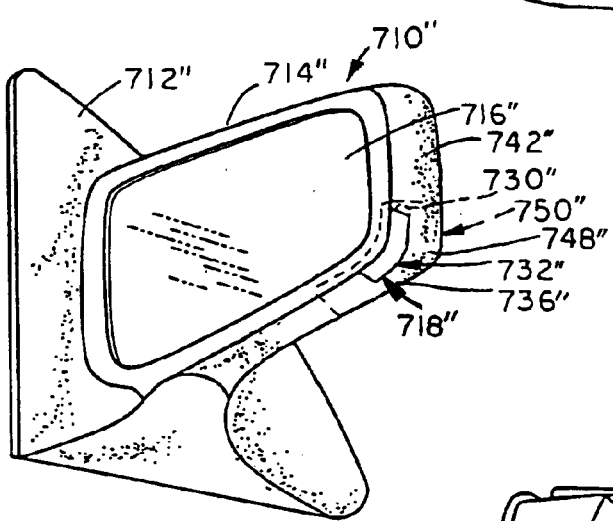
FIG. 42C is a perspective view of a ninth embodiment of an exterior rearview mirror assembly.

Optionally, a ground illuminating security light (or a signal light) can be incorporated into non-folding or the fixed portion of exterior rearview mirror assembly 710. Thus, a security light or signal light can be incorporated at or into the neck 36 and fixed or stationary panel or sail 38 of the exterior rearview mirror assembly of FIG. 1. For example, such as illustrated in FIGS. 42A and 42B, a security light such as floodlight 751 can be included, preferably in lower portion of base or sail 712. Preferably floodlight 751 is similar in construction to security light 516 and 616 described previously. Floodlight 751 preferably remains generally fixed with respect to the vehicle and is unaffected by the repositioning of the folding portion of assembly 710. Thus, when, for example, housing 714 is moved toward the side of the vehicle under a break-away motion or due to actuation of a powerfold mechanism, the lighted security zone established by the light pattern projected from floodlight 751 remains substantially unchanged. Optionally, a security light can be incorporated into both, or only one of, the folding portion and the non-folding portion (i.e. their removable portion and their stationary or fixed portion) of a break-away or powerfold exterior mirror assembly.

Furthermore, floodlight 751 may be a serviceable, water impervious light module that is incorporated into an exterior rearview assembly, such as into a bracket of the exterior rearview mirror assembly, in a manner that sustains the aerodynamics and styling of the assembly.

Figure 42D:
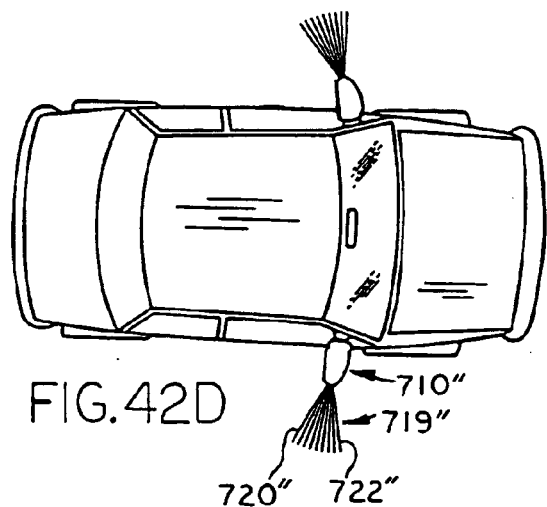
FIG. 42D is a plan view of a vehicle with foldable driver and passenger side rearview mirror assemblies incorporating the exterior rearview mirror assembly of FIG. 42C.

Referring to FIG. 42B, an eighth embodiment of exterior rearview mirror assembly 710" is illustrated. Exterior rearview mirror assembly 710" includes a mounting portion 712" and a housing 714", which includes a reflective element 716", similar to the previous embodiments. Housing 714" also includes a light assembly 718" for illuminating the ground adjacent the vehicle. Light assembly 718" includes a light source 730" and a light conduiting member 732", for example a light pipe, which is adapted to direct light downwardly and laterally from the vehicle when the exterior rearview mirror assembly 710" is in its normal use position, as illustrated in FIG. 42D. Light assembly 718" produces a light pattern 719" which is defined between leading edges 720" and 722", which form a cone light pattern which is substantially orthogonal to the centerline or longitudinal axis 719a of the vehicle as shown in FIG. 39. Alternately, individual light emitting sources such as light emitting diodes or incandescent micro lamps can be located in the assembly such that some are projecting light substantially orthogonally to the vehicle centerline 719a whereas others are projecting light substantially parallel to the vehicle centerline 719a. For further details of the light source and light conduiting member, reference is made to the previous embodiments.

Similar to the previous embodiment, light conduiting member 732" wraps around a lower outboard corner of housing 714" from a lower wall 736" to an outboard wall 742" of housing 714". In this manner, when the folding portion of exterior rearview mirror assembly 710" is moved between its normal use position, as illustrated in FIG. 42D, to a folded position, due to a break-away force or actuation by a powerfold mechanism, light pattern 719" extends generally rearward and laterally from the vehicle similar to light pattern 723 shown in FIG. 40. It should be understood, that the range of light pattern 719" may be increased or decreased by varying the optics of light conduiting member 732", as would be understood by those skilled in the art.

Furthermore, similar to the previous embodiment, light signal 718" may be incorporated into a housing 748" to form a light module 750" similar to light module 750 described in reference to the previous embodiment. In this manner, signal light 718" may be easily removed for replacement or service. In addition, module 750" may incorporate other devices, as will be more fully described below.

Figure 43:
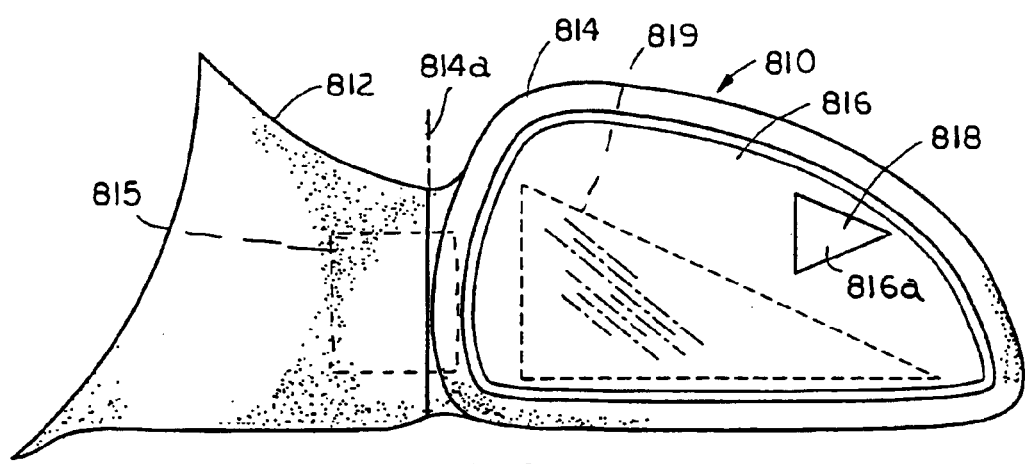
FIG. 43 is an elevation view of a tenth embodiment of the exterior rearview mirror assembly of the present invention.

Referring to FIG. 43, a tenth embodiment of exterior rearview mirror assembly 810 is shown. Exterior rearview mirror assembly 810 includes a mounting portion or sail 812 and a mirror housing 814 which is mounted to or formed with sail 812. As described in reference to the earlier embodiments, exterior rearview mirror assembly 810 may comprise a fixed mirror assembly, a break-away mirror assembly, or the like. Furthermore, exterior rearview mirror assembly 810 may optionally include a powerfold mechanism 815 as noted in reference to the previous embodiments. In the illustrated embodiment, housing 814 is mounted for pivotal movement about axis 814a. Positioned in housing 814 is a reflective element 816 and a signal light assembly 818, which directs light at least laterally and rearwardly of the vehicle and, further, away from the vehicle to restrict light from entering the vehicle so that the light is substantially unobservable by the occupant of the vehicle.

Signal light assembly 818 is positioned behind reflective element 816 and preferably positioned to minimize the interference with the typical field of view of an exterior rearview mirror assembly 810 designated by area 819 in FIG. 43. Preferably, signal light assembly 818 is positioned at a top outboard location of reflective element 816.

Reflective element 816 comprises a substrate 820 (see FIG. 44), for example a glass substrate, which includes a mirror reflective coating 822 on its front surface 820a (alternatively, mirror reflective coating 822 could be on the rear surface of 820). For example, a reflective coating 822 may comprise a metal reflective coating, such as silver, aluminum, palladium, chromium, rhodium, rhodium/chromium, or binary reflectors, or the like. For examples of other suitable reflective coatings, reference is made to the previous embodiment. In order to direct light through reflective element 816, a portion of the reflective coating, such as a chrome metal film, on glass substrate 820 is at least partially locally removed, for example by etching or as masked during deposition, to form a window 816a. In this manner, window 816a transmits at least 60% of visible light emitted by the signal light element placed behind surface 820a of substrate 820, more preferably at least 70% of visible light, and most preferably at least 80% of visible light. In the illustrated embodiment, the portion of reflective element that is removed preferably forms a turn signal indicia, for example a triangular shape or an arrow shape; however, it can be appreciated that other shapes of windows, including a plurality of discrete windows, may be used. In this manner, signal light assembly 818 directs light through the glass substrate. Preferably, window 816a comprises a clear, highly transparent portion of reflective element 816, and most preferably reflective coating 822 is fully removed. Consequently, the signal light can be readily observed by an approaching driver whether or not the signal light is actuated. Optionally, window 816a may include an electrochromic layer to vary the intensity of the light from signal light 818. For examples of suitable electrochromic layers, reference is made to U.S. Pat. Nos. 5,729,379 and 5,780,160, disclosures of which are hereby incorporated by reference in their entireties.

Mirror reflective element 816 is supported by a reflective element support member 824, such as a backing plate, which is preferably mounted to a positioning device, for example an electrical actuator, a manual actuator, or the like, to permit repositioning of reflective element 816 within housing 814. However, it should be understood, that reflective element 816 may comprise a fixed reflective element. Also supported on backing plate 824 is signal light assembly 818.

Figure 44:
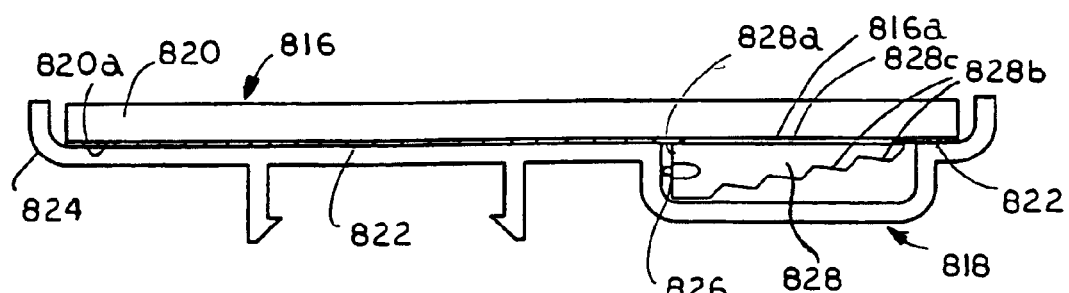
FIG. 44 is a cross-sectional view taken along line XXXXIV—XXXXIV of FIG. 43.

As best seen in FIG. 44, signal light assembly 818 includes a light source 826 and light conduiting member 828, such as a light pipe. Light conduiting member 828 is of similar construction to light conduiting members 230 and 250. As previously described in reference to light pipes 230 and 250, light conduiting member 828 includes a light input surface 828a, a plurality of internal reflective surfaces 828b, and a light emitting surface 828c. Internal reflective surfaces 828b direct light from light source 826 outwardly through light emitting surface 828c while directing light away from the operator of the vehicle such that the light is substantially unobserved by the driver. Again, for examples of light sources and further description of suitable housing materials, and light conduiting members, reference is made to the previous embodiments.

Figure 45:
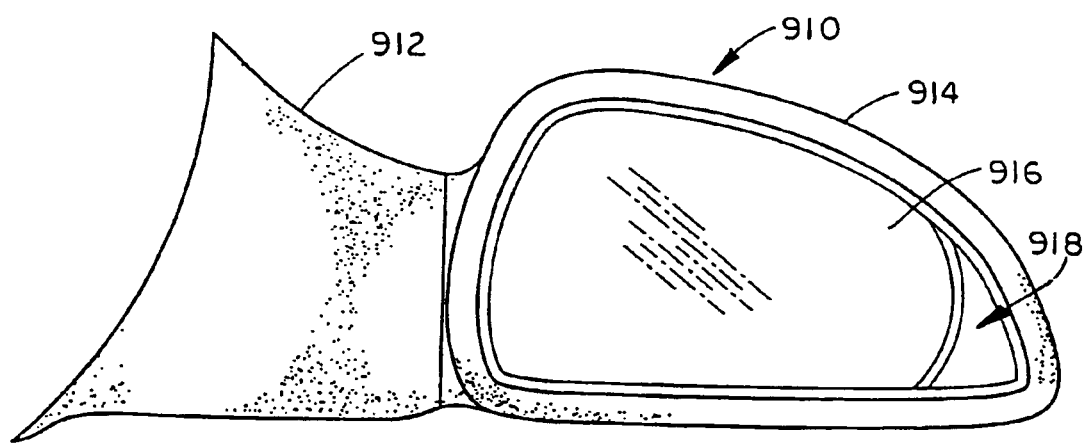
FIG. 45 is an elevation view of an eleventh embodiment of the exterior rearview mirror of the present invention.
Figure 46:
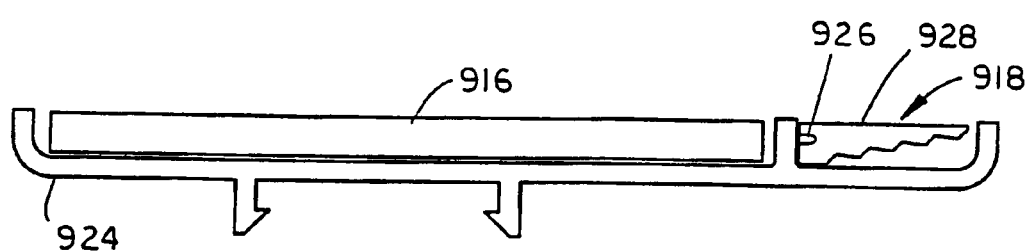
FIG. 46 is a cross-sectional view taken along line XXXXVI—XXXXVI of FIG. 45.

Referring to FIGS. 45 and 46, an eleventh embodiment 910 of an exterior rearview mirror assembly is illustrated. Exterior rearview mirror assembly 910 includes a mounting portion or sail 912 and a housing 914 which is formed with or mounted to sail 912. Included in housing 914, are a reflective element 916 and a signal light assembly 918. Reflective element 916 comprises a conventional reflective element; therefore, reference is made to the previous embodiments for some examples of suitable reflective elements. Reflective element 916 is supported in housing 914 by a mirror support or backing plate 924 and is preferably mounted for pivotal movement by an actuator, for example an electrical actuator, a manual actuator, or the like. Alternatively, mirror support 924 may be mounted to a fixed support arm within mirror housing 914.

Supported on mirror support 924 adjacent reflective element 916 is signal light assembly 918. Signal light assembly 918 directs light laterally and rearwardly from the vehicle and, further, away from the vehicle so that the light is substantially unobservable to the occupant of the vehicle. As best seen in FIG. 46, signal light assembly 918 includes at least one light source 926 and a light conduiting member 928 similar to the previous embodiment. Also similar to the previous embodiment, signal light 918 is positioned preferably in an outboard position to minimize the interference with the field of view of mirror element 916. Preferably, light conduiting member 928 and reflective element 916 are substantially aligned in a common plane so that the outer surface of signal light assembly 918 is generally flush with reflective element 916 to form substantially contiguous surfaces. Reference is made to the previous embodiments for further details of suitable light sources and light conduiting members. Optionally, light assembly 918 may include a cover (not shown) to seal light source. However, it should be understood that a sealant may be used in lieu of a separate cover, such as an epoxy.

The concepts of this invention are applicable to a variety of exterior vehicular mirror assembly constructions, including one-part designs, uni-body constructions, and their like, as known in the exterior mirror assembly art. The concepts of the invention are also applicable to a variety of assemblies including assemblies that use a bracket as a distinct internal structure and assemblies that do not use a bracket but rather are bracket-less assemblies where the housing itself serves as a structural element with means such as on the walls of the housing for securing an actuator and for receiving a light module.

Also, although desirably and preferably finding utility as a security light, the exterior mirror assembly security light modules of this invention are also useful for other purposes such as providing for a courtesy exterior light, a general ground illumination light when such lighting may be desired such as when a door is opening, a key is inserted, or a keyboard entry is touched, or when approach of a person to a vehicle is detected such as by voice activation, proximity detection and the like. Also, light modules using the principles and concepts described herein could be provided for mounting on the vehicle other than within an exterior mirror assembly, such as under a door within a door well or under a door body panel so as to provide ground illumination directly under a door whenever said door is opened.

Figure 47:
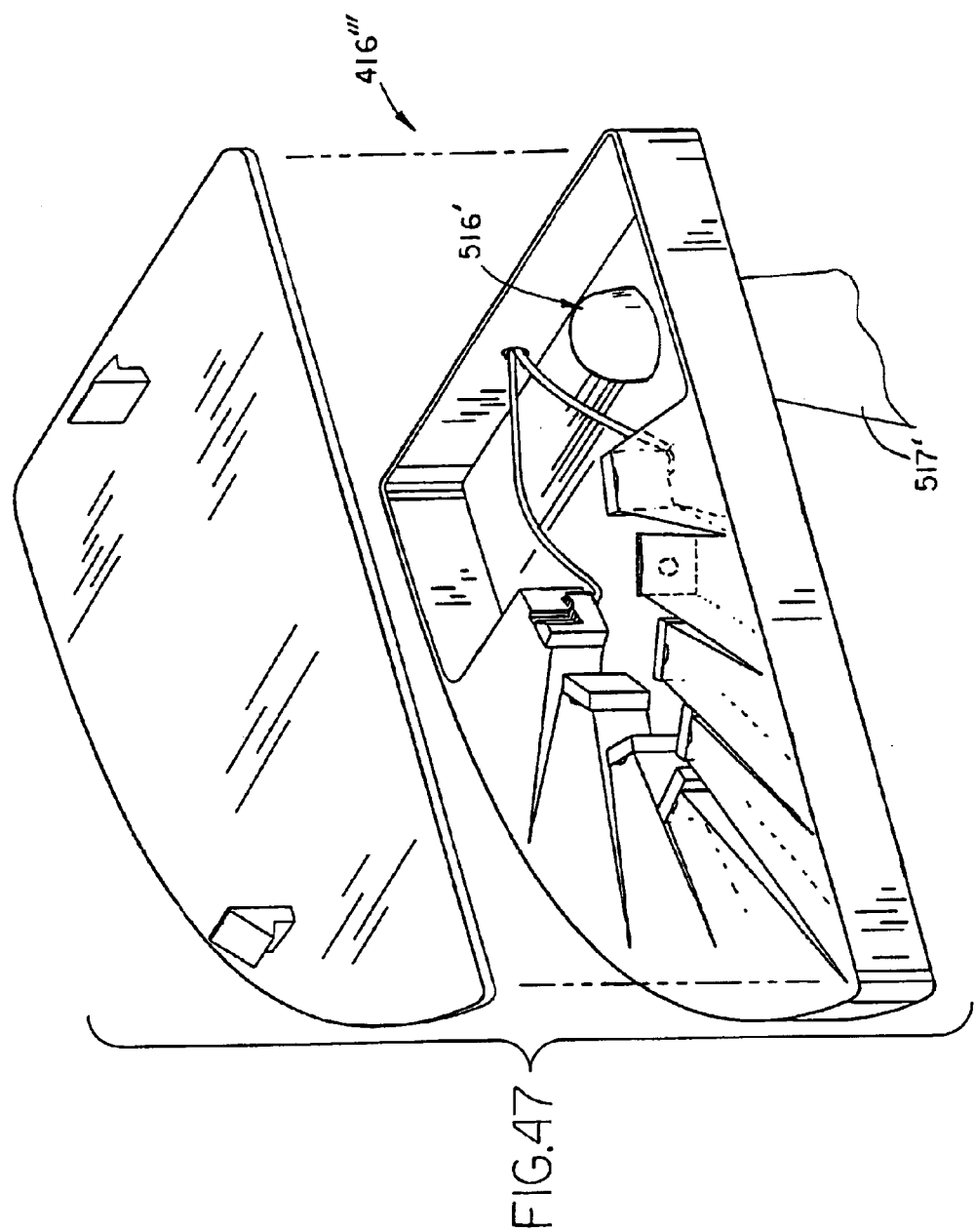
FIG. 47 is a perspective view of a signal light module incorporating a security light.

In addition, the signal light modules of the present invention may incorporate a security light. For example, referring to FIG. 47, a signal light module 416''', which is of similar construction to signal light module 416, incorporates a security light module 516'. Security light module 516' is of similar construction to security light modules 516 or 616. In the illustrated embodiment, security module 516' is mounted to the lower wall of signal light module 416''' and projects a light pattern 517' similar to light pattern 517. It should be understood that the location of security light module 516' within signal light module 416''' is just one exemplary illustration and that other locations within signal light module 416''' are also contemplated. Furthermore, the optics of security light module 516' may be adjusted, as would be understood, to accommodate the numerous other desirable locations within signal light assembly 416''' to provide similar light patterns as described in further detail in reference to the previous embodiments. Likewise, the security light modules of the present invention may incorporate a signal light. In preferred form, the signal light modules (or security light modules or combined security light/turn signal light modules) complete or form the lower portion of the exterior mirror housing. In this manner, the signal light modules may be easily removed for replacement or service. Also, the signal light modules may also include other lighting features, such as ground illumination lights which are activated when the door is opened, such as when the key is inserted into the door lock or when remotely unlocked by an electronic key or by voice activation, or when the car is approached by a person as detected, for example, by a proximity detector system. Other features which may be incorporated or combined with the signal light modules and security light modules include: blind spot detectors; sensors, for example control sensors for control circuits including control circuits for electrochromic elements, temperature sensors for controls or indicators, heading sensors; intelligent highway control systems (IHCS); intrusion detectors; antennas, such as a GPS antenna, car phone antennas, radio antenna, and the like; microphones; speakers; garage door opener transmitters and antennas; an automatic toll booth payment system, such as a PASS™ system; transceivers; a node and/or controller for a vehicle multiplex and/or car area network; a remote transaction system; or telecommunication devices, such as ONSTAR™ found in General Motor vehicles of Detroit, Mich., or RESCU™ available from Ford Motor Company of Detroit, Mich. Such remote transaction systems may, for example, include such remote transaction systems described in U.S. patent application Ser. No. 09/057,428 filed Apr. 8, 1998, now U.S. Pat. No. 6,158,655, commonly assigned to Donnelly Corporation of Holland, Mich., the disclosure of which is incorporated in its entirety by reference herein. Further features may include providing the exterior mirror systems with plug-in electrical connectors, which permit the security light modules and signal light modules of the present invention to be easily and quickly plugged in to the exterior mirror assembly without the need for extra wiring (such as wire harnesses, cables, and the like). Examples of suitable plug-in electrical connectors are shown in U.S. application Ser. No. 08/978,593 entitled MODULAR EXTERIOR REARVIEW MIRROR ASSEMBLY, now U.S. Pat. No. 6,007,222, which is commonly assigned to Donnelly Corporation of Holland, Mich., which is herein incorporated by reference in its entirety.

In addition, the signal light modules of the present invention may include incorporated therein one or more cameras. These cameras may be forward and/or rearward facing depending on the application. For example, cameras may be used as a part of a headlamp control system, such as disclosed in U.S. Pat. No. 5,796,094, a rearview vision system for vehicles, such as disclosed in U.S. Pat. No. 5,670,935 and in PCT Publication No. 96/38319, an image capture system, such as disclosed in pending U.S. patent application Ser. No. 09/199,907, filed Nov. 25, 1998, all commonly assigned to Donnelly Corporation of Holland, Mich. and incorporated by reference herein in their entireties. In addition, the cameras may be supplied with an electrochromic filter, such as disclosed in pending provisional Pat. application Ser. No. 60/135,657 filed May 24, 1999, which is also commonly assigned to Donnelly Corporation of Holland, Mich., the disclosure of which is incorporated by reference herein in its entirety.

In preferred form, both the signal light modules and security light modules are detachable so that they can either be replaced as a whole unit or serviced with individual components of the respective modules being detachable for repair or replacement. In some applications, it may be more commercially attractive to make the whole module replaceable as a unit rather than the individual components. In other instances, it may be more commercially attractive to make some or all the individual components replaceable or serviceable, for example the bulb or bulbs may be individually replaceable. In addition, both or either the signal lights and security lights may be used as a marker or location indicator, such as a car find feature, with the lights being actuated, for example, by a key fob, to flash for intervals, for example, one second intervals, five second intervals, or 15 intervals, or the like. However, when the signal light or security light is used for this feature, it is preferred that this marker function is locked out when the vehicle is operating, for example by using a lock-out circuit as previously described.

In order to minimize exposure to moisture and other elements, the signal light modules and security light modules of the present invention may be fabricated as water impervious modules. The modules may include one or more moisture escape routes, for example ports with covers that permit egress of moisture from the module but restrict moisture ingress. One example of such a cover is a patch of a semi-permeable membrane, such as GORTEX™. Alternately, the modules may include a drain to permit moisture to drain from the module.

While several forms of the invention have been shown and described, other forms will now become apparent to those skilled in the art. For example, the signal light assembly (216, 316, 416, 818, or 918) may project a white light or other colored light including a red light or a blue light (such as could be generated by a blue LED or blue phosphor). Likewise, the security light module (516, 616, or 718) may project a colored light, such as an amber light or a red light as desired. Furthermore, as described in reference to the first embodiment, rearview mirror assemblies 310, 410, 510, 610, 810, or 910 may comprise fixed position mirror assemblies or break-away mirror assemblies. Changes and modification in the specifically described embodiments can be carried out without departing from the principles of the invention, which is intended to be limited only by the scope of the appended claims, as interpreted according to the principles of patent law including the doctrine of equivalents. Therefore, it will be understood that the embodiment shown in the drawings described above are merely for illustrated purposes only and are not intended to limit the scope of the invention, which is defined by the claims that follow.

We claim:

1. A lighted exterior mirror system for a vehicle comprising:
an exterior mirror assembly, said exterior mirror assembly comprising a first portion adapted for mounting to a vehicle, a second portion, and a reflective element;
a reflective element support member supporting said reflective element, said reflective element support member mounting to an actuator operable to adjust the rearward field of view of said reflective element when said exterior mirror assembly is mounted to a vehicle, said actuator disposed at said second portion;
a turn signal indicator;
said turn signal indicator disposed adjacent to and separate from said reflective element, said turn signal indicator emitting a light beam at least generally laterally and rearwardly of the vehicle when said exterior mirror assembly is mounted to a vehicle and when said turn signal indicator is actuated;
said turn signal indicator adjusting in tandem with said reflective element upon adjustment by said actuator of the rearward field of view of said reflective element;
said light beam substantially unobservable by the driver of the vehicle; and
wherein said light beam does not pass through said reflective element.

2. The lighted exterior rearview mirror system according to claim 1, wherein said turn signal indicator includes an outer surface facing rearwardly of the vehicle when said mirror assembly is mounted to a vehicle, said reflective element having an outer surface facing rearwardly of the vehicle when said mirror assembly is mounted to a vehicle, said outer surface of said turn signal indicator being generally contiguous with said outer surface of said reflective element.

3. The lighted exterior rearview minor system of claim 1, wherein said turn signal indicator includes a light source, said light source chosen from an incandescent source, a fluorescent source, and a light emitting diode.

4. The lighted exterior rearview mirror system according to claim 1, wherein said reflective element support member comprises a plastic backing plate.

5. The lighted exterior rearview mirror system according to claim 1, wherein said turn signal indicator is disposed in said second portion of said exterior mirror assembly at a location generally laterally outboard of an edge portion of said reflective element, said edge portion of said reflective element being closer to the side of the vehicle to which said exterior minor assembly is mounted than said outboard location of said turn signal indicator.

6. The lighted exterior rearview mirror system according to claim 1, wherein said second portion is movably connected to said first portion.

7. The lighted exterior rearview mirror system according to claim 6, wherein said second portion is movably connected to said first portion by a connection chosen from at least one of a break-away connection and a power-fold connection.

8. The lighted exterior rearview mirror system according to claim 1, wherein said turn signal indicator comprises a portion forming an apex.

9. The lighted exterior rearview mirror system according to claim 8, wherein said apex is located at or near an outboard region of said second portion.

10. The lighted exterior rearview mirror system according to claim 8, wherein said turn signal indicator comprises a generally triangular shaped portion.

11. The lighted exterior rearview mirror system according to claim 1, wherein said turn signal indicator comprises a light conduiting member.

12. The lighted exterior rearview mirror system according to claim 11, wherein said turn signal indicator further comprising a light source, said light source directing light into said conduiting member.

13. The lighted exterior rearview mirror system according to claim 12, wherein said light conduiting member includes a light input portion and a surface facing rearwardly of the vehicle when said mirror assembly is mounted to a vehicle, said light conduiting member being configured to direct light from said light input portion to and out from said rearwardly facing surface.

14. The lighted exterior rearview mirror system according to claim 13, wherein said rearwardly facing surface is generally planar.

15. The lighted exterior rearview mirror system according to claim 13, wherein said light conduiting member includes a plurality of internal reflective surfaces for directing light from said light input portion to and out from said rearwardly facing surface.

16. The lighted exterior rearview mirror system according to claim 15, wherein said light conduiting member includes a portion with a stepped configuration to thereby form said internal reflective surfaces.

17. The lighted exterior rearview mirror system according to claim 13, wherein said reflective element has an outer surface facing rearwardly of the vehicle when said mirror assembly is mounted to a vehicle, said rearwardly facing surface of said light conduiting member being generally co-planar with said outer surface of said reflective element.

18. The lighted exterior rearview mirror system according to claim 17, wherein said rearwardly facing surface of said light conduiting member forms a generally triangular shaped turn signal indicator.

19. The lighted exterior rearview mirror system according to claim 11, wherein said reflective element support supports said light conduiting member.

20. The lighted exterior rearview mirror system according to claim 19, wherein said reflective element support includes a member positioned between said light conduiting member and said reflective element.

21. The lighted exterior rearview mirror system according to claim 19, wherein said support member includes adjacent recesses, a first of said recesses having said reflective element positioned therein, and a second of said recesses having said light conduiting member positioned therein.

22. The lighted exterior rearview mirror system according to claim 21, wherein said light conduiting member includes a light input portion and a rearwardly facing surface forming said turn signal indicator, said light conduiting member being configured to direct light from said light input portion to and out from said rearwardly facing surface.

23. The lighted exterior rearview mirror system according to claim 22, wherein said light conduiting member includes a plurality of internal reflective surfaces for directing light from said light input portion to and out from said rearwardly facing surface.

24. The lighted exterior rearview mirror system according to claim 23, wherein said rearwardly facing surface forms a triangular-shaped turn signal indicator.

25. The lighted exterior rearview mirror system according to claim 24, wherein said rearwardly facing surface is a substantially continuous surface.

26. A lighted exterior mirror system for a vehicle comprising:

an exterior mirror assembly, said exterior mirror assembly comprising a first portion adapted for mounting to a vehicle, a second portion, and a reflective element;

a reflective element support member supporting said reflective element, said reflective element support member mounting to an actuator operable to adjust the rearward field of view of said reflective element when said exterior mirror assembly is mounted to a vehicle, said actuator disposed at said second portion;

a turn signal indicator;

said turn signal indicator disposed adjacent to and separate from said reflective element, said turn signal indicator emitting a light beam at least generally laterally and rearwardly of the vehicle when said exterior mirror assembly is mounted to a vehicle and when said turn signal indicator is actuated;

said turn signal indicator adjusting in tandem with said reflective element upon adjustment by said actuator of the rearward field of view of said reflective element;

said light beam substantially unobservable by the driver of the vehicle;

wherein said light beam does not pass through said reflective element; and wherein said turn signal indicator comprise a generally triangular shaped turn signal indicator.

27. The lighted exterior rearview mirror system according to claim 26, wherein said turn signal indicator includes an outer surface facing rearwardly of the vehicle when said mirror assembly is mounted to a vehicle, said reflective element having an outer surface facing rearwardly of the vehicle when said mirror assembly is mounted to a vehicle, said outer surface of said turn signal indicator being generally contiguous with said outer surface of said reflective element.

28. The lighted exterior rearview mirror system according to claim 26, wherein said triangular-shaped turn signal indicator includes an apex, said apex being located at or near an outboard region of said second portion.

29. The lighted exterior rearview mirror system according to claim 28, wherein said turn signal indicator is disposed in said second portion of said exterior mirror assembly at a location generally laterally outboard of an edge portion of said reflective element, said edge portion of said reflective element being closer to the side of the vehicle to which said exterior mirror assembly is mounted than said outboard location of said turn signal indicator.

30. The lighted exterior rearview mirror system according to claim 26, wherein said turn signal indicator comprises a light conduiting member.

31. The lighted exterior rearview mirror system of claim 26, wherein said turn signal indicator includes a light source, said light source chosen from an incandescent source, a fluorescent source, and a light emitting diode.

32. The lighted exterior rearview mirror system according to claim 26, wherein said reflective element support member comprises a plastic backing plate.

33. The lighted exterior rearview mirror system according to claim 26, wherein said second portion is movably connected to said first portion.

34. The lighted exterior rearview mirror system according to claim 33, wherein said second portion is movably connected to said first portion by a connection chosen from at least one of a break-away connection and a power-fold connection.

35. The lighted exterior rearview mirror system according to claim 30, wherein said turn signal indicator further comprises a light source, said light source directing light into said conduiting member.

36. The lighted exterior rearview mirror system according to claim 35, wherein said light conduiting member includes a light input portion and a rearwardly facing surface facing rearwardly of the vehicle when said mirror assembly is mounted to a vehicle, said light conduiting member being configured to direct light from said light input portion to and out from said rearwardly facing surface.

37. The lighted exterior rearview mirror system according to claim 36, wherein said rearwardly facing surface is generally planar.

38. The lighted exterior rearview mirror system according to claim 36, wherein said light conduiting member includes a plurality of internal reflective surfaces for directing light from said light input portion to and out from said rearwardly facing surface.

39. The lighted exterior rearview mirror system according to claim 38, wherein said light conduiting member includes a portion with a stepped configuration to thereby form said internal reflective surfaces.

40. The lighted exterior rearview mirror system according to claim 36, wherein said reflective element has an outer surface facing rearwardly of the vehicle when said mirror assembly is mounted to a vehicle, said rearwardly facing surface of said light conduiting member being generally co-planar with said outer surface of said reflective element.

41. The lighted exterior rearview mirror system according to claim 40, wherein said rearwardly facing surface is generally planar.

42. The lighted exterior rearview mirror system according to claim 30, wherein said reflective element support member supports said light conduiting member.

43. The lighted exterior rearview mirror system according to claim 42, wherein said reflective element support member includes a member positioned between said light conduiting member and said reflective element.

44. The lighted exterior rearview mirror system according to claim 42, wherein said support member includes adjacent recesses, a first of said recesses having said reflective element positioned therein, and a second of said recesses having said light conduiting member positioned therein.

45. The lighted exterior rearview mirror system according to claim 44, wherein said light conduiting member includes a light input portion and a rearwardly facing surface forming said turn signal indicator, said light conduiting member being configured to direct light from said light input portion to and out from said rearwardly facing surface.

46. The lighted exterior rearview mirror system according to claim 45, wherein said light conduiting member includes a plurality of internal reflective surfaces for directing light from said light input portion to and out from said rearwardly facing surface.

47. The lighted exterior rearview mirror system according to claim 46, wherein said rearwardly facing surface forms said triangular-shaped turn signal indicator.

48. The lighted exterior rearview mirror system according to claim 47, wherein said rearwardly facing surface is a substantially continuous surface.

49. A lighted exterior mirror system for a vehicle comprising:

an exterior mirror assembly, said exterior mirror assembly comprising a first portion adapted for mounting to a vehicle, a second portion, and a reflective element;

a reflective element support member supporting said reflective element, said reflective element support member mounting to an actuator operable to adjust the rearward field of view of said reflective element when said exterior mirror assembly is mounted to a vehicle, said actuator disposed at said second portion;

a turn signal indicator;

said turn signal indicator disposed adjacent to and separate from said reflective element, said turn signal indicator emitting a light beam at least generally laterally and rearwardly of the vehicle when said exterior mirror assembly is mounted to a vehicle and when said turn signal indicator is actuated;

said turn signal indicator adjusting in tandem with said reflective element upon adjustment by said actuator of the rearward field of view of said reflective element;

said light beam substantially unobservable by the driver of the vehicle;

wherein said light beam does not pass through said reflective element; and wherein said second portion is movably connected to said first portion by a connection chosen from at least one of a break-away connection and a power-fold connection.

50. The lighted exterior rearview mirror system according to claim 49, wherein said turn signal indicator comprises a generally triangular shaped portion.

51. The lighted exterior rearview mirror system according to claim 49, wherein said turn signal indicator includes an outer surface facing rearwardly of the vehicle when said mirror assembly is mounted to a vehicle, said reflective element having an outer surface facing rearwardly of the vehicle when said mirror assembly is mounted to a vehicle, said outer surface of said turn signal indicator being generally contiguous with said outer surface of said reflective element.

52. The lighted exterior rearview mirror system of claim 49, wherein said turn signal indicator includes a light source, said light source chosen from an incandescent source, a fluorescent source, and a light emitting diode.

53. The lighted exterior rearview mirror system according to claim 49, wherein said reflective element support member comprises a plastic backing plate.

54. The lighted exterior rearview mirror system according to claim 49, wherein said turn signal indicator is disposed in said second portion of said exterior mirror assembly at a location generally laterally outboard of an edge portion of said reflective element, said edge portion of said reflective element being closer to the side of the vehicle to which said exterior mirror assembly is mounted than said outboard location of said turn signal indicator.

55. The lighted exterior rearview mirror system according to claim 49, wherein said turn signal indicator comprises a portion forming an apex.

56. The lighted exterior rearview mirror system according to claim 55, wherein said apex is located at or near an outboard region of said second portion.

57. The lighted exterior rearview mirror system according to claim 49, wherein said turn signal indicator comprises a light conduiting member.

58. The lighted exterior rearview mirror system according to claim 57, wherein said reflective element support member supports said light conduiting member.

59. The lighted exterior rearview mirror system according to claim 58, wherein said reflective element support member includes a member positioned between said light conduiting member and said reflective element.

60. The lighted exterior rearview mirror system according to claim 59, wherein said support member includes adjacent recesses, a first of said recesses having said reflective element positioned therein, and a second of said recesses having said light conduiting member positioned therein.

61. The lighted exterior rearview mirror system according to claim 60, wherein said light conduiting member includes a light input portion and a rearwardly facing surface forming said turn signal indicator, said light conduiting member being configured to direct light from said light input portion to and out from said rearwardly facing surface.

62. The lighted exterior rearview mirror system according to claim 61, wherein said light conduiting member includes a plurality of internal reflective surfaces for directing light from said light input portion to and out from said rearwardly facing surface.

63. The lighted exterior rearview mirror system according to claim 62, wherein said rearwardly facing surface forms a triangular-shaped turn signal indicator.

64. The lighted exterior rearview mirror system according to claim 63, wherein said rearwardly facing surface is a substantially continuous surface.

65. The lighted exterior rearview mirror system according to claim 57, wherein said turn signal indicator further comprising a light source, said light source directing light into said conduiting member.

66. The lighted exterior rearview mirror system according to claim 65, wherein said light conduiting member includes a light input portion and a rearwardly facing surface facing rearwardly of the vehicle when said mirror assembly is mounted to a vehicle, said light conduiting member being configured to direct light from said light input portion to and out from said rearwardly facing surface.

67. The lighted exterior rearview mirror system according to claim 66, wherein said rearwardly facing surface is generally planar.

68. The lighted exterior rearview mirror system according to claim 66, wherein said light conduiting member includes a plurality of internal reflective surfaces for directing light from said light input portion to and out from said rearwardly facing surface.

69. The lighted exterior rearview mirror system according to claim 68, wherein said light conduiting member includes a portion with a stepped configuration to thereby form said internal reflective surfaces.

70. The lighted exterior rearview mirror system according to claim 66, wherein said reflective element has an outer surface facing rearwardly of the vehicle when said mirror assembly is mounted to a vehicle, said rearwardly facing surface of said light conduiting member being generally co-planar with said outer surface of said reflective element.

71. The lighted exterior rearview mirror system according to claim 70, wherein said rearwardly facing surface of said light conduiting member forms a generally triangular shaped turn signal indicator.

72. A lighted exterior mirror system for a vehicle comprising:

an exterior mirror assembly, said exterior mirror assembly comprising a first portion adapted for mounting to a vehicle, a second portion, and a reflective element;

a reflective element support member supporting said reflective element, said reflective element support member mounting to an actuator operable to adjust the rearward field of view of said reflective element when said exterior mirror assembly is mounted to a vehicle, said actuator disposed at said second portion;

a turn signal indicator;

said turn signal indicator disposed adjacent to and separate from said reflective element, said turn signal indicator emitting a light beam at least generally laterally and rearwardly of the vehicle when said exterior mirror assembly is mounted to a vehicle and when said turn signal indicator is actuated;

said turn signal indicator adjusting in tandem with said reflective element upon adjustment by said actuator of the rearward field of view of said reflective element;

said light beam substantially unobservable by the driver of the vehicle;

wherein said light beam does not pass through said reflective element;

wherein said second portion is movably connected to said first portion by a connection chosen from at least one of a break-away connection and a power-fold connection; and wherein said turn signal indicator is disposed in said second portion of said exterior mirror assembly at a location generally laterally outboard of an edge portion of said reflective element, said edge portion of said reflective element being closer to the side of the vehicle to which said exterior mirror assembly is mounted than said outboard location of said turn signal indicator.

73. The lighted exterior rearview mirror system according to claim 72, wherein said turn signal indicator includes an outer surface facing rearwardly of the vehicle when said mirror assembly is mounted to a vehicle, said reflective element having an outer surface facing rearwardly of the vehicle when said mirror assembly is mounted to a vehicle, said outer surface of said turn signal indicator being generally contiguous with said outer surface of said reflective element.

74. The lighted exterior rearview mirror system of claim 72, wherein said turn signal indicator includes a light source, said light source chosen from an incandescent source, a fluorescent source, and a light emitting diode.

75. The lighted exterior rearview mirror system according to claim 72, wherein said reflective element support member comprises a plastic backing plate.

76. The lighted exterior rearview mirror system according to claim 72, wherein said turn signal indicator comprises a portion forming an apex.

77. The lighted exterior rearview mirror system according to claim 76, wherein said apex is located at or near an outboard region of said second portion.

78. The lighted exterior rearview mirror system according to claim 76, wherein said turn signal indicator comprises a generally triangular shaped portion.

79. The lighted exterior rearview mirror system according to claim 72, wherein said support member includes adjacent recesses, a first of said recesses having said reflective element positioned therein, and a second of said recesses having said turn signal indicator positioned therein.

80. The lighted exterior rearview mirror system according to claim 79, wherein said turn signal indicator comprises a light conduiting member, said light conduiting member including a light input portion and a rearwardly facing surface forming said turn signal indicator, said light conduiting member being configured to direct light from said light input portion to and out from said rearwardly facing surface.

81. The lighted exterior rearview mirror system according to claim 80, wherein said light conduiting member includes a plurality of internal reflective surfaces for directing light from said light input portion to and out from said rearwardly facing surface.

82. The lighted exterior rearview mirror system according to claim 81, wherein said rearwardly facing surface forms a triangular-shaped turn signal indicator.

83. The lighted exterior rearview mirror system according to claim 82, wherein said rearwardly facing surface is a substantially continuous surface.

84. The lighted exterior rearview mirror system according to claim 72, wherein said turn signal indicator comprises a light conduiting member.

85. The lighted exterior rearview mirror system according to claim 84, wherein said reflective element support member supports said light conduiting member.

86. The lighted exterior rearview mirror system according to claim 85, wherein said reflective element support member includes a member positioned between said light conduiting member and said reflective element.

87. The lighted exterior rearview mirror system according to claim 84, wherein said turn signal indicator further comprises a light source, said light source directing light into said conduiting member.

88. The lighted exterior rearview mirror system according to claim 87, wherein said light conduiting member includes a light input portion and a rearwardly facing surface facing rearwardly of the vehicle when said mirror assembly is mounted to a vehicle, said light conduiting member being configured to direct light from said light input portion to and out from said rearwardly facing surface.

89. The lighted exterior rearview mirror system according to claim 88, wherein said reflective element has an outer surface facing rearwardly of the vehicle when said mirror assembly is mounted to a vehicle, said rearwardly facing surface of said light conduiting member being generally co-planar with said outer surface of said reflective element.

90. The lighted exterior rearview mirror system according to claim 88, wherein said rearwardly facing surface of said light conduiting member forms a generally triangular shaped turn signal indicator.

91. The lighted exterior rearview mirror system according to claim 88, wherein said light conduiting member includes a plurality of internal reflective surfaces for directing light from said light input portion to and out from said rearwardly facing surface.

92. The lighted exterior rearview mirror system according to claim 91, wherein said light conduiting member includes a portion with a stepped configuration to thereby form said internal reflective surfaces.

93. The lighted exterior rearview mirror system according to claim 92, wherein said rearwardly facing surface is generally planar.

* * * * *

UNITED STATES PATENT AND TRADEMARK OFFICE
CERTIFICATE OF CORRECTION

| | | |
|---|---|---|
| PATENT NO. | : 7,083,312 B2 | Page 1 of 1 |
| APPLICATION NO. | : 10/770097 | |
| DATED | : August 1, 2006 | |
| INVENTOR(S) | : Todd W. Pastrick et al. | |

It is certified that error appears in the above-identified patent and that said Letters Patent is hereby corrected as shown below:

Column 14:
Line 19, "CE" should be --CIE--.

Column 31:
Line 36, Claim 3, "minor" should be --mirror--.
Line 49, Claim 5, "minor" should be --mirror--.

Signed and Sealed this

Thirteenth Day of February, 2007

JON W. DUDAS
*Director of the United States Patent and Trademark Office*